(12) United States Patent
Kawarai et al.

(10) Patent No.: US 12,253,180 B2
(45) Date of Patent: Mar. 18, 2025

(54) VALVE DEVICE

(71) Applicant: MIKUNI CORPORATION, Tokyo (JP)

(72) Inventors: Hiroyuki Kawarai, Kanagawa (JP); Yasuhiro Tochigi, Kanagawa (JP); Toshiaki Fujitani, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 35 days.

(21) Appl. No.: 18/327,084

(22) Filed: Jun. 1, 2023

(65) Prior Publication Data

US 2024/0035579 A1 Feb. 1, 2024

(30) Foreign Application Priority Data

Jul. 26, 2022 (JP) .................................. 2022-118479

(51) Int. Cl.
*F16K 11/085* (2006.01)
*F16K 5/04* (2006.01)

(52) U.S. Cl.
CPC ........ *F16K 11/0853* (2013.01); *F16K 5/0407* (2013.01); *F16K 5/0471* (2013.01)

(58) Field of Classification Search
CPC .. F16K 11/0853; F16K 5/0407; F16K 5/0471; F16K 27/065
See application file for complete search history.

(56) References Cited

U.S. PATENT DOCUMENTS

| | | | | | |
|---|---|---|---|---|---|
| 2,154,945 | A | * | 4/1939 | Kyes | F23K 3/00 406/182 |
| 4,474,149 | A | * | 10/1984 | Idogaki | F16K 31/0682 123/308 |
| 4,566,494 | A | * | 1/1986 | Roche | E21B 21/106 251/1.2 |
| 5,343,841 | A | * | 9/1994 | Hattori | F02D 9/16 137/454.6 |
| 5,617,815 | A | * | 4/1997 | Spies | F16K 11/0853 123/41.1 |
| 10,865,668 | B2 | * | 12/2020 | Wong | F01L 7/02 |
| 2015/0354716 | A1 | * | 12/2015 | Morein | F16K 11/0853 137/625.47 |

(Continued)

FOREIGN PATENT DOCUMENTS

JP 2017044266 3/2017

*Primary Examiner* — Patrick C Williams
(74) *Attorney, Agent, or Firm* — JCIPRNET

(57) ABSTRACT

A valve device includes a housing and a cylindrical valve body. The housing defines: an inflow port; a first outflow port and a second outflow port which are opened apart in a circumferential direction and respectively have first and second opening widths; and an accommodation chamber. The valve body is arranged in the accommodation chamber to open and close the first and second outflow ports and includes: an internal passage; a first outflow communication port which expands in one direction in the circumferential direction continuously with a region facing the first outflow port, and has an opening width larger than the first opening width; and a second outflow communication port which expands in the other direction in the circumferential direction continuously with a region facing the second outflow port, and has an opening width larger than the second opening width.

24 Claims, 32 Drawing Sheets

(56) References Cited

U.S. PATENT DOCUMENTS

| | | | |
|---|---|---|---|
| 2017/0130849 A1* | 5/2017 | Demitroff | F16K 11/07 |
| 2018/0292016 A1* | 10/2018 | Ledvora | F16K 5/0471 |
| 2020/0103039 A1* | 4/2020 | Kashiwagi | F16K 27/065 |
| 2022/0025976 A1* | 1/2022 | Graichen | F16K 11/0833 |

* cited by examiner

VALVE DEVICE

CROSS-REFERENCE TO RELATED APPLICATION

This application claims the priority benefit of Japan application serial no. 2022-118479, filed on Jul. 26, 2022. The entirety of the above-mentioned patent application is hereby incorporated by reference herein and made a part of this specification.

BACKGROUND

Technical Field

The disclosure relates to a valve device capable of adjusting a flow rate of a fluid, and in particular, to a valve device that includes one inflow port and two outflow ports and is capable of adjusting a flow rate of a fluid flowing out from the two outflow ports by rotating a valve body.

Related Art

As a conventional valve device, a flow path switching valve, which is a three-way switching valve, has been disclosed to include: a valve main body including one inflow port and two outflow ports; a motor arranged above the valve main body; a seal member arranged in a valve chamber of the valve main body; and a cylindrical valve body that is accommodated in a region surrounded by the seal member, includes two communication ports opened at an outer peripheral surface, and is rotationally driven by the motor (e.g., Patent Document 1: JP 2017-44266 A).

With the inflow port formed at the valve main body constantly communicating with the valve chamber, the flow path switching valve includes an open-open mode in which the two outflow ports communicate with the valve chamber, a close-close mode in which the two outflow ports are blocked from the valve chamber, an open-close mode in which one outflow port communicates with the valve chamber and the other outflow port is blocked from the valve chamber, and a close-open mode in which one outflow port is blocked from the valve chamber and the other outflow port communicates with the valve chamber, and one operation mode out of the four open/close modes is selected.

That is, the flow path switching valve only operates in modes in which the two outflow ports are both opened or both closed, or one of the two outflow ports is opened and the other is closed. Thus, of two fluid supply destinations, in the case where a supply amount of one fluid supply destination is to be reduced while maintaining a supply amount of the other fluid supply destination to be constant, it is not possible to perform an operation of throttling the flow rate of one outflow port without changing the flow rate of the other outflow port.

SUMMARY

A valve device according to an embodiment of the disclosure includes a housing and a valve body in a cylindrical shape. The housing defines: a main flow port through which a fluid passes; a first flow port and a second flow port which are opened apart in a circumferential direction at an inner peripheral surface centered on a predetermined axis to allow the fluid to pass therethrough and respectively have a first opening width and a second opening width in the circumferential direction; and an accommodation chamber. The valve body is arranged in the accommodation chamber and is capable of rotating around the axis to open and close the first flow port and the second flow port. The valve body includes: an internal passage which communicates with the main flow port; a first communication port which expands in one direction in the circumferential direction continuously with a region facing the first flow port to allow communication between the internal passage and the first flow port, and has an opening width larger than the first opening width; and a second communication port which expands in the other direction in the circumferential direction continuously with a region facing the second flow port to allow communication between the internal passage and the second flow port, and has an opening width larger than the second opening width.

In the valve device, taking the opening width of the first communication port as $Vw_1$, the opening width of the second communication port as $Vw_2$, the first opening width of the first flow port as $Hw_1$, and the second opening width of the second flow port as $Hw_2$, the valve device may be configured to satisfy:

$$Vw_1 \geq Hw_1 + Hw_2$$

$$Vw_2 \geq Hw_2 + Hw_1.$$

In the valve device, the first flow port and the second flow port may be formed plane-symmetrically with respect to a central plane including the axis. The first communication port and the second communication port may be formed plane-symmetrically with respect to the central plane including the axis.

In the valve device, the first flow port and the second flow port may be arranged at positions separated by 180 degrees around the axis.

In the valve device, the main flow port may be arranged to be opened to the inner peripheral surface centered on the axis of the housing.

In the valve device, the first flow port and the second flow port may be arranged at a same position in a direction of the axis. The main flow port may be opened to the inner peripheral surface and arranged at a same position as the first flow port and the second flow port in the direction of the axis. The valve body may include a main communication port having an opening width larger than the opening widths of the first communication port and the second communication port to allow communication between the main flow port and the internal passage.

In the valve device, the main flow port may be opened to the inner peripheral surface and arranged at a same position as the first flow port and the second flow port in the direction of the axis. The valve body may be arranged with a gap with respect to the inner peripheral surface. The valve device may include an annular seal member arranged between an outer peripheral surface of the valve body and the inner peripheral surface of the housing around the first flow port and the second flow port.

In the valve device, the main flow port may be opened to the inner peripheral surface and arranged at a same position as the first flow port and the second flow port in the direction of the axis. The valve body may be arranged with a gap with respect to the inner peripheral surface. The valve device may include: an annular seal member arranged between an outer peripheral surface of the valve body and the inner peripheral surface of the housing around the first flow port and the second flow port; and an annular seal member arranged between the outer peripheral surface of the valve body and the inner peripheral surface of the housing around the main flow port.

In the valve device, the first flow port and the second flow port may be arranged at a same position in a direction of the axis. The main flow port may be opened to the inner peripheral surface and arranged at a position separated from the valve body in the direction of the axis.

In the valve device, the main flow port may be opened to the inner peripheral surface and arranged at a position separated from the valve body. The valve body may be arranged with a gap with respect to the inner peripheral surface. The valve device may include an annular seal member arranged between an outer peripheral surface of the valve body and the inner peripheral surface of the housing around the first flow port and the second flow port.

In the valve device, the main flow port may be arranged to be opened to the inner peripheral surface. The housing may include: a housing body which defines the main flow port, the first flow port, the second flow port, and the accommodation chamber; and a housing cover coupled to the housing body to close the accommodation chamber.

In the valve device, the main flow port may be arranged to be opened to the inner peripheral surface. The housing may include: a housing body which defines the main flow port, the first flow port, the second flow port, and the accommodation chamber; and a housing cover coupled to the housing body to close the accommodation chamber. The first flow port and the second flow port may be formed plane-symmetrically with respect to a central plane including the axis. The first communication port and the second communication port may be formed plane-symmetrically with respect to the central plane.

In the valve device, the main flow port may be arranged to be opened to the inner peripheral surface. The housing may include: a housing body which defines the main flow port, the first flow port, the second flow port, and the accommodation chamber; and a housing cover coupled to the housing body to close the accommodation chamber. The first flow port and the second flow port may be arranged at positions separated by 180 degrees around the axis.

In the valve device, the main flow port may be arranged to be opened to the inner peripheral surface. The housing may include: a housing body which defines the main flow port, the first flow port, the second flow port, and the accommodation chamber; and a housing cover coupled to the housing body to close the accommodation chamber. The housing body may include: a main connection pipe which defines a main passage leading to the main flow port; a first connection pipe which defines a first passage leading to the first flow port; and a second connection pipe which defines a second passage leading to the second flow port.

In the valve device, the main flow port may be arranged to be opened to the inner peripheral surface. The valve device may include a drive source which rotationally drives the valve body around the axis. The housing may include: a housing body which defines the main flow port, the first flow port, the second flow port, and the accommodation chamber; and a housing cover coupled to the housing body to close the accommodation chamber. The valve body may include a rotating shaft coupled to a rotor of the drive source. The housing body may include a fixing part which fixes the drive source and an insertion hole through which the rotating shaft passes. The housing cover may include a support part which rotatably supports the valve body.

In the valve device, the main flow port may be arranged to be opened to the inner peripheral surface. The valve device may include a drive source which rotationally drives the valve body around the axis. The housing may include: a housing body which defines the main flow port, the first flow port, the second flow port, and the accommodation chamber; and a housing cover coupled to the housing body to close the accommodation chamber. The main flow port may be an inflow port for flowing in the fluid. The first flow port may be a first outflow port for flowing out the fluid. The second flow port may be a second outflow port for flowing out the fluid.

In the valve device, the main flow port may be arranged to be opened in a central region including the axis of the housing.

In the valve device, the main flow port may be arranged to be opened in a central region including the axis of the housing. The first flow port and the second flow port may be formed plane-symmetrically with respect to a central plane including the axis. The first communication port and the second communication port may be formed plane-symmetrically with respect to the central plane.

In the valve device, the main flow port may be arranged to be opened in a central region including the axis of the housing. The first flow port and the second flow port may be arranged at positions separated by 180 degrees around the axis.

In the valve device, the main flow port may be arranged to be opened in a central region including the axis. The valve body may be arranged with a gap with respect to the inner peripheral surface. The valve device may include an annular seal member arranged between an outer peripheral surface of the valve body and the inner peripheral surface of the housing around the first flow port and the second flow port.

In the valve device, the main flow port may be arranged to be opened in a central region including the axis. The housing may include: a housing body which defines the first flow port, the second flow port, and the accommodation chamber; and a housing cover which defines the main flow port and is coupled to the housing body to close the accommodation chamber.

In the valve device, the main flow port may be arranged to be opened in a central region including the axis. The housing may include: a housing body which defines the first flow port, the second flow port, and the accommodation chamber; and a housing cover which defines the main flow port and is coupled to the housing body to close the accommodation chamber. The housing body may include: a first connection pipe which defines a first passage leading to the first flow port; and a second connection pipe which defines a second passage leading to the second flow port. The housing cover may include a main connection pipe which defines a main passage leading to the main flow port.

In the valve device, the main flow port may be arranged to be opened in a central region including the axis. The valve device may include a drive source which rotationally drives the valve body around the axis. The valve body may include a rotating shaft coupled to a rotor of the drive source. The housing may include: a housing body which defines the first flow port, the second flow port, and the accommodation chamber; and a housing cover which defines the main flow port and is coupled to the housing body to close the accommodation chamber. The housing body may include a fixing part which fixes the drive source and an insertion hole through which the rotating shaft passes. The housing cover may include a support part which rotatably supports the valve body.

In the valve device, the main flow port may be arranged to be opened in a central region including the axis. The housing may include: a housing body which defines the first flow port, the second flow port, and the accommodation chamber; and a housing cover which defines the main flow port and is coupled to the housing body to close the accommodation chamber. The main flow port may be an inflow port for flowing in the fluid. The first flow port may be a first outflow port for flowing out the fluid. The second flow port may be a second outflow port for flowing out the fluid.

According to the valve device having the above configuration, it is possible to throttle a flow rate of one flow port without changing a flow rate of the other flow port in a configuration including two flow ports (e.g., outflow ports) arranged in a circumferential direction, while achieving reduction in thickness in the axial direction or reduction in diameter in a radial direction perpendicular to the axis, which thus achieves downsizing.

DESCRIPTION OF THE EMBODIMENTS

Figure 1:
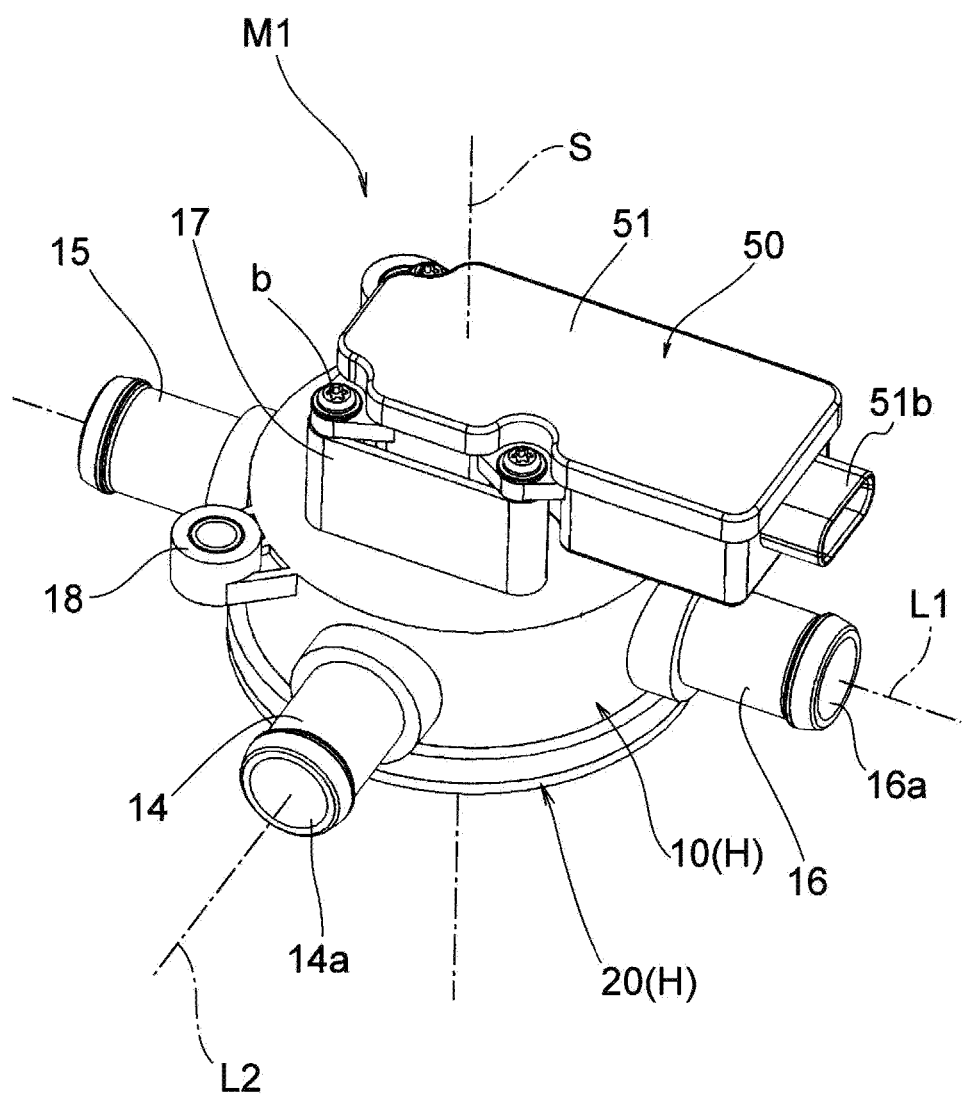
FIG. 1 is an external perspective view showing a valve device according to a first embodiment of the disclosure viewed from one side of a housing in an axial direction along an axis that is a center of rotation of a valve body.
Figure 2:
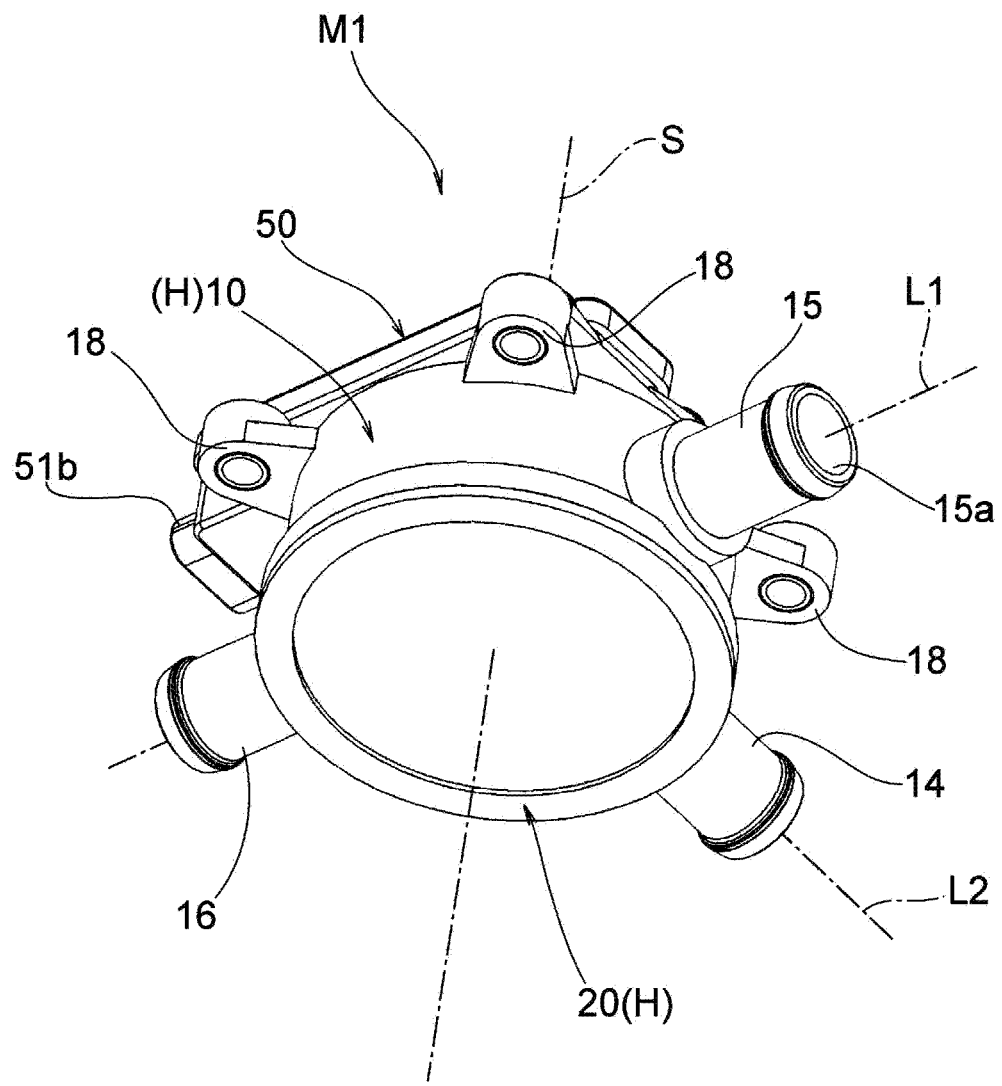
FIG. 2 is an external perspective view showing the valve device according to the first embodiment viewed from the other side of the housing in the axial direction.

Embodiments of the disclosure provide a valve device capable of throttling a flow rate of one flow port without changing a flow rate of the other flow port in a configuration including two flow ports (e.g., outflow ports) arranged in a circumferential direction.

Hereinafter, embodiments of the disclosure will be described with reference to the accompanying drawings. A valve device according to the disclosure is applied, for example, to adjust a flow rate of cooling water to two supply destinations in a cooling water supply system for a vehicle or the like.

As shown in FIG. 1 to FIG. 5, a valve device M1 according to a first embodiment includes a housing body 10 and a housing cover 20 as a housing H, a valve body 30, two seal members 41 and 42, a drive unit 50 as a drive source, an annular seal member 60, and three screws b.

The housing body 10 is formed of a material such as a resin material, metal, or alloy and includes a cylindrical part 11 centered on an axis S, a top plate part 12, two mounting parts 13, an inflow connection pipe 14 as a main connection pipe, a first outflow connection pipe 15 as a first connection pipe, a second outflow connection pipe 16 as a second connection pipe, a fixing part 17, and three boss parts 18.

Figure 3:
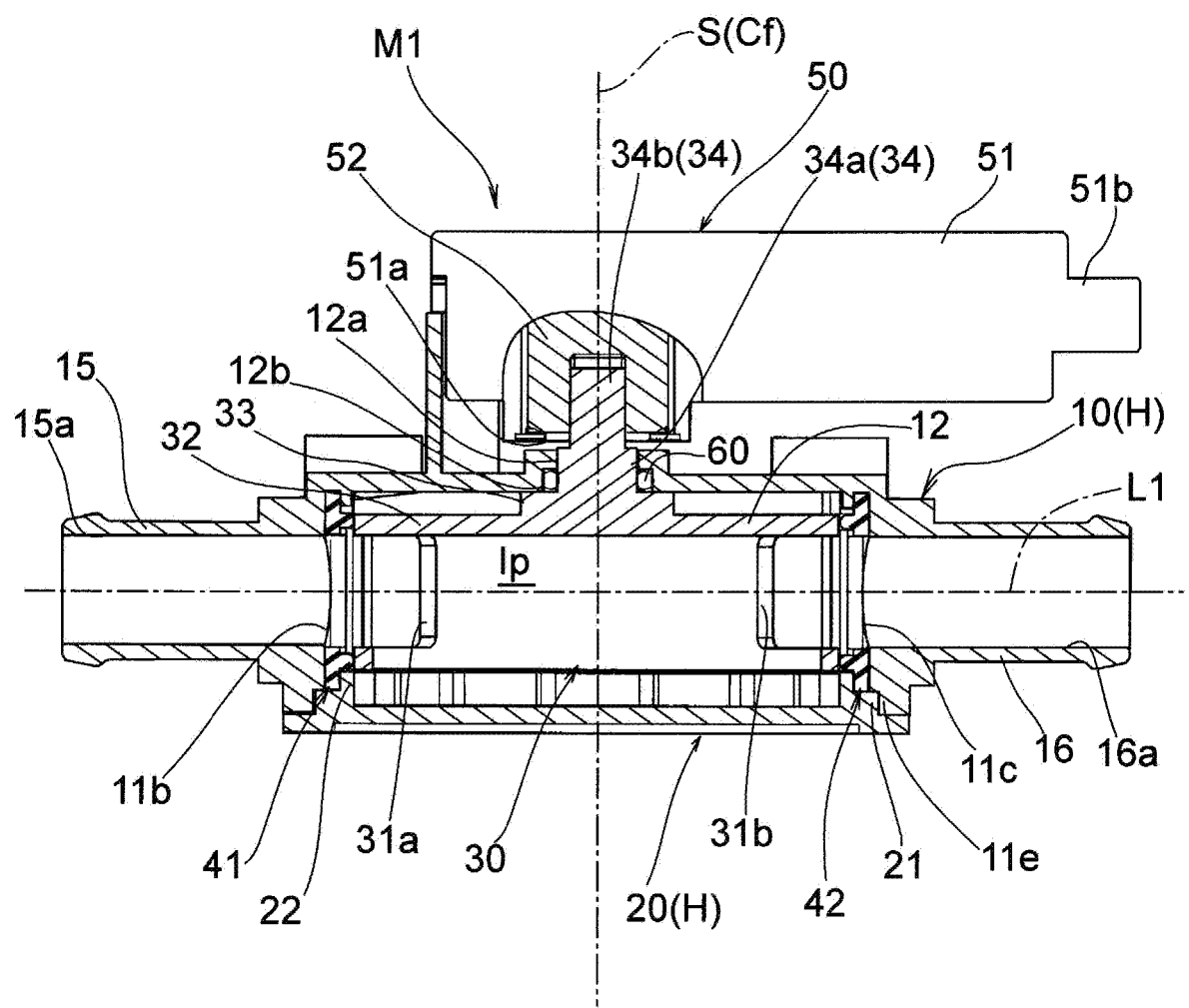
FIG. 3 is a cross-sectional view of the valve device according to the first embodiment taken along a plane including the axis which is the center of rotation of the valve body.
Figure 6:
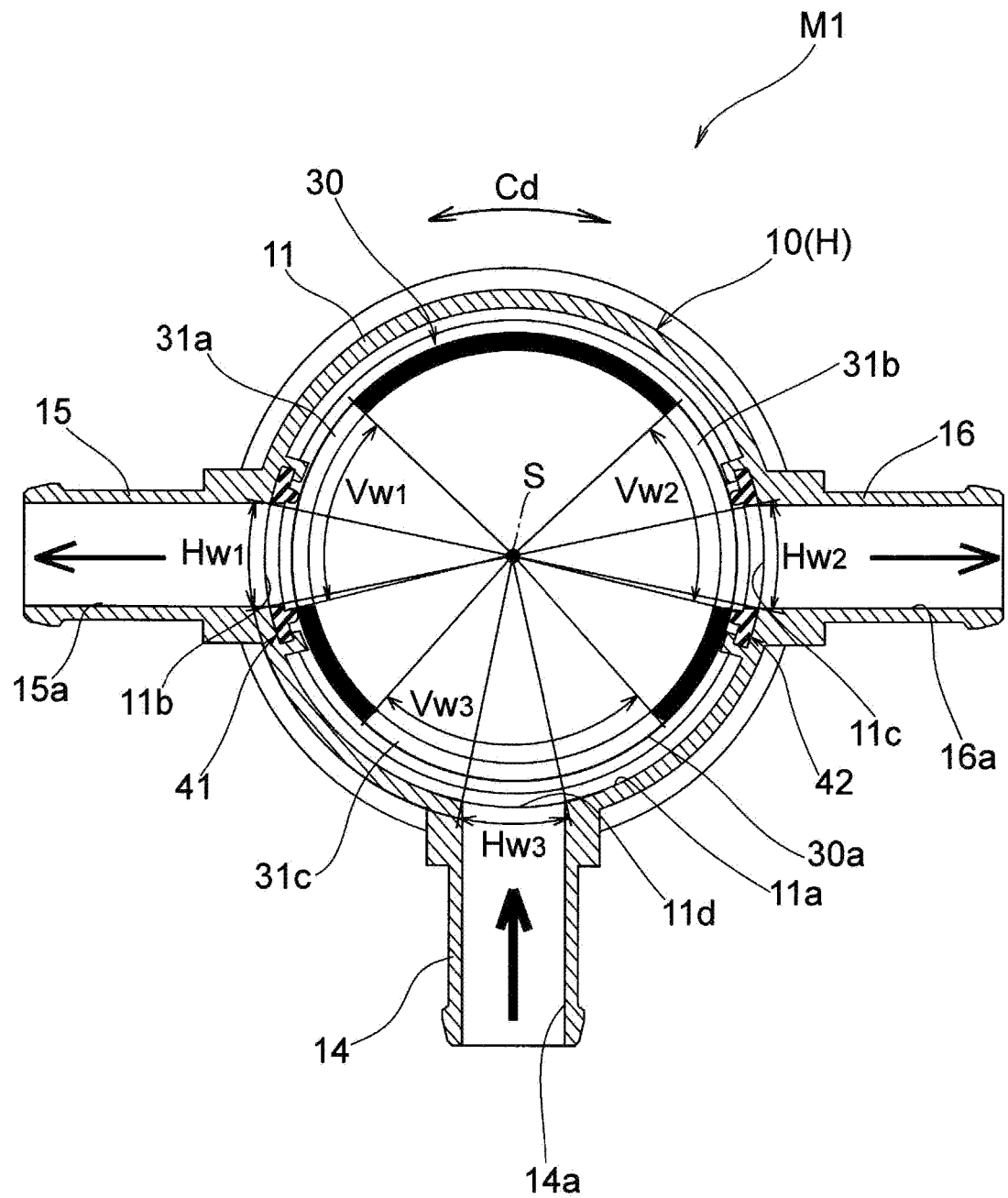
FIG. 6 is a cross-sectional view of the valve device according to the first embodiment taken along a plane that is perpendicular to the axis and passes through a center line of a first flow port (first outflow port) and a second flow port (second outflow port), showing a fully open-fully open state in which the first flow port (first outflow port) and the second flow port (second outflow port) are fully opened.

As shown in FIG. 3 and FIG. 6, the cylindrical part 11 includes an accommodation chamber C that accommodates the valve body 30, a first outflow port 11b as a first flow port and a second outflow port 11c as a second flow port that are opened apart in a circumferential direction Cd at an inner peripheral surface 11a, an inflow port 11d as a main flow port that is opened apart from the first outflow port 11b and the second outflow port 11c at the inner peripheral surface 11a, and a coupling part 11e.

The inner peripheral surface 11a is formed as a cylindrical surface centered on the axis S and is opposed to an outer peripheral surface 30a of the valve body 30 with a predetermined gap therebetween. The first outflow port 11b is a region from which a fluid flows out, forms an elliptical opening having a first opening width $Hw_1$ in the circumferential direction Cd, and leads to a first outflow passage 15a as a first passage defined by the first outflow connection pipe 15. The second outflow port 11c is a region from which the fluid flows out, forms an elliptical opening having a second opening width $Hw_2$ in the circumferential direction Cd, and leads to a second outflow passage 16a as a second passage defined by the second outflow connection pipe 16.

Herein, as shown in FIG. 3 and FIG. 6, the first outflow port 11b and the second outflow port 11c are arranged on a straight line L1 perpendicular to the axis S; that is, they are arranged at the same position in the axis S direction, are arranged at positions separated by 180 degrees around the axis S, and are formed plane-symmetrically with respect to a central plane Cf including the axis S. Thus, the first outflow port 11b and the second outflow port 11c form the same opening shape, and the first opening width $Hw_1$ of the first outflow port 11b and the second opening width $Hw_2$ of the second outflow port 11c are formed to have the same dimension.

The inflow port 11d is a region through which the fluid flows in, and forms an elliptical opening having an opening width $Hw_3$ in the circumferential direction Cd and centered on a straight line L2 that is perpendicular to the straight line L1 and located on the central plane Cf including the axis S. The inflow port 11d leads to an inflow passage 14a as a main passage defined by the inflow connection pipe 14. The opening width $Hw_3$ of the inflow port 11d is formed to have the same dimension as the first opening width $Hw_1$ of the first outflow port 11b and the second opening width $Hw_3$ of the second outflow port 11c. The coupling part 11e is a region coupling the housing cover 20 and is formed in a ring shape with a concave step centered on the axis S.

The top plate part 12 is a region that closes one end side of the cylindrical part 11 in the axis S direction, and includes an insertion hole 12a centered on the axis S, an annular recess 12b formed around the insertion hole 12a, and a stopper part 12c that protrudes inward in the axis S direction and extends in the radial direction. The insertion hole 12a is formed to allow a rotating shaft 34 of the valve body 30 to rotatably pass through. The annular recess 12b is formed to receive the annular seal member 60 which seals between the rotating shaft 34 of the valve body 30 and the housing body 10. The stopper part 12c serves to restrict rotation of the valve body 30 beyond a predetermined range by abutting against a protrusion 32a of the valve body 30.

The two mounting parts 13 serve for mounting the seal members 41 and 42 in regions corresponding to the first outflow port 11b and the second outflow port 11c, and are formed as ridges that protrude inward from the inner peripheral surface 11a, define fitting grooves facing each other in the circumferential direction Cd, and extend in the axis S direction. Then, the seal members 41 and 42 inserted from an opening defined on the inner side of the coupling part 11e of the cylindrical part 11 are positioned and held by the mounting parts 13 respectively around the first outflow port 11b and the second outflow port 11c.

The inflow connection pipe 14 connects a fluid introduction pipe of an application target object, and defines the inflow passage 14a which extends about the straight line L2 in the radial direction perpendicular to the axis S and leads to the inflow port 11d. The first outflow connection pipe 15 connects a first fluid lead-out pipe of the application target object, and defines the first outflow passage 15a which extends about the straight line L1 in the radial direction perpendicular to the axis S and leads to the first outflow port 11b. The second outflow connection pipe 16 connects a second fluid lead-out pipe of the application target object, and defines the second outflow passage 16a which extends about the straight line L1 in the radial direction perpendicular to the axis S and leads to the second outflow port 11c.

The fixing part 17 is a region that fixes the drive unit 50, and includes an upright wall 17a protruding in the axis S direction on the outer side of the top plate part 12, and three female screw holes 17b formed at the upright wall 17a. Then, by joining the drive unit 50 along the upright wall 17a and screwing the screws b into the female screw holes 17b through circular holes 51c of the drive unit 50, the drive unit 50 is fixed to the fixing part 17.

The three boss parts 18 are formed such that, by joining the boss parts 18 to the application target object in the axis S direction and screwing screws or bolts into female screw holes of the application target object, the valve device M1 is fixed to the application target object.

The housing cover 20 is formed of the same material as the housing body 10 into a disk shape, and includes a fitting part 21 fitted to the coupling part 11e of the housing body 10 and a support part 22 supporting the valve body 30 in the axis S direction. The fitting part 21 is formed as a ring-shaped protrusion fitted to the coupling part 11e of the housing body 10, and is fixed by welding or the like as necessary after being fitted to the coupling part 11e. The support part 22 is formed as a ring-shaped protrusion centered on the axis S, and supports the valve body 30 accommodated in the accommodation chamber C of the housing body 10 in the axis S direction. With the valve body 30 accommodated in the accommodation chamber C, the housing cover 20 is coupled to the housing body 10 to close the accommodation chamber C.

The valve body 30 is formed of a material such as a resin material, metal, or alloy into a cylindrical shape, and, as shown in FIG. 3 to FIG. 6, the valve body 30 includes a cylindrical part 31 that defines an outer peripheral surface 30a centered on the axis S and an internal passage Ip, a top plate part 32 that closes one end part of the cylindrical part 31 in the axis S direction, a protruding disk part 33 centered on the axis S formed continuously with the top plate part 32, and a rotating shaft 34 centered on the axis S formed continuously with the protruding disk part 33.

As shown in FIG. 6, the cylindrical part 31 includes a first outflow communication port 31a as a first communication port, a second outflow communication port 31b as a second communication port, and an inflow communication port 31c as a main communication port. The first outflow communication port 31a is formed as a substantially rectangular curved opening that is arranged at the same position as the first outflow port 11b in the axis S direction to allow communication between the internal passage Ip and the first outflow port 11b, and passes from one end side over the other end side of the first outflow port 11b in the circumferential direction Cd to extend in one direction in the circumferential direction Cd. That is, the first outflow communication port 31a is formed as an elongated opening that expands in one direction (clockwise in FIG. 6) in the circumferential direction Cd continuously with a region facing the first outflow port 11b, and has an opening width $Vw_1$ larger than the first opening width $Hw_1$ of the first outflow port 11b.

The second outflow communication port 31b is formed as a substantially rectangular curved opening that is arranged at the same position as the second outflow port 11c in the axis S direction to allow communication between the internal passage Ip and the second outflow port 11c, and passes from one end side over the other end side of the second outflow port 11c in the circumferential direction Cd to extend in the other direction in the circumferential direction Cd. That is, the second outflow communication port 31b is formed as an elongated opening that expands in the other direction (counterclockwise in FIG. 6) in the circumferential direction Cd continuously with a region facing the second outflow port 11c, and has an opening width $Vw_2$ larger than the second opening width $Hw_3$ of the second outflow port 11c.

The inflow communication port 31c is formed as a substantially rectangular curved opening, i.e., an elongated opening, that is arranged at the same position as the inflow port 11d in the axis S direction to allow communication between the inflow port 11d and the internal passage Ip, and has an opening width $Vw_3$ larger than the opening width $Vw_1$ of the first outflow communication port 31a and the opening width $Vw_2$ of the second outflow communication port 31b.

Herein, upon conversion of each opening width in the circumferential direction Cd into a central angle (included angle) centered on the axis S, the first opening width $Hw_1$ of the first outflow port 11b is set to about 25 degrees to 27 degrees, the second opening width $Hw_3$ of the second outflow port 11c is set to about 25 degrees to 27 degrees, the opening width $Hw_3$ of the inflow port 11d is set to about 25 degrees to 27 degrees, the opening width $Vw_1$ of the first outflow communication port 31a is set to about 55 degrees to 57 degrees, the opening width $Vw_2$ of the second outflow communication port 31b is set to about 55 degrees to 57 degrees, and the opening width $Vw_3$ of the inflow communication port 31c is set to about 84 degrees to 86 degrees. The first outflow communication port 31a and the second outflow communication port 31b are formed plane-symmetrically with respect to the central plane Cf including the axis S. In the state shown in FIG. 6, the inflow communication port 31c is arranged such that its center in the circumferential direction Cd is positioned on the central plane Cf.

The top plate part 32 is formed in a disk shape to be arranged in parallel with the top plate part 12 of the housing body 10 with a gap therebetween, and includes a protrusion 32a that extends in the radial direction at a surface opposed to the top plate part 12. The protrusion 32a restricts rotation of the valve body 30 beyond a predetermined range by abutting against the stopper part 12c of the housing body 10. The protruding disk part 33 protrudes from the top plate part 32 in the axis S direction about the axis S to slidably abut against the top plate part 12 of the housing body 10. The rotating shaft 34 includes a columnar part 34a and a connecting part 34b formed continuously with the columnar part 34a. The columnar part 34a is passed through the insertion hole 12a of the housing body 10, and the annular seal member 60 is in close contact with an outer peripheral surface of the columnar part 34a at a region of the annular recess 12b of the housing body 10. The connecting part 34b is formed to be connected to a rotor 52 of the drive unit 50 to rotate integrally with the rotor 52.

In the valve body 30 configured as described above, the outer peripheral surface 30a is rotatably arranged in the accommodation chamber C with a predetermined gap with respect to the inner peripheral surface 11a of the housing body 10, and the outer peripheral surface 30a is in slidable and close contact with the seal members 41 and 42 attached to the inner peripheral surface 11a of the housing body 10. The valve body 30 is appropriately rotationally driven around the axis S by the drive unit 50 to be capable of opening and closing the first outflow port 11b and the second outflow port 11c.

Figure 4:
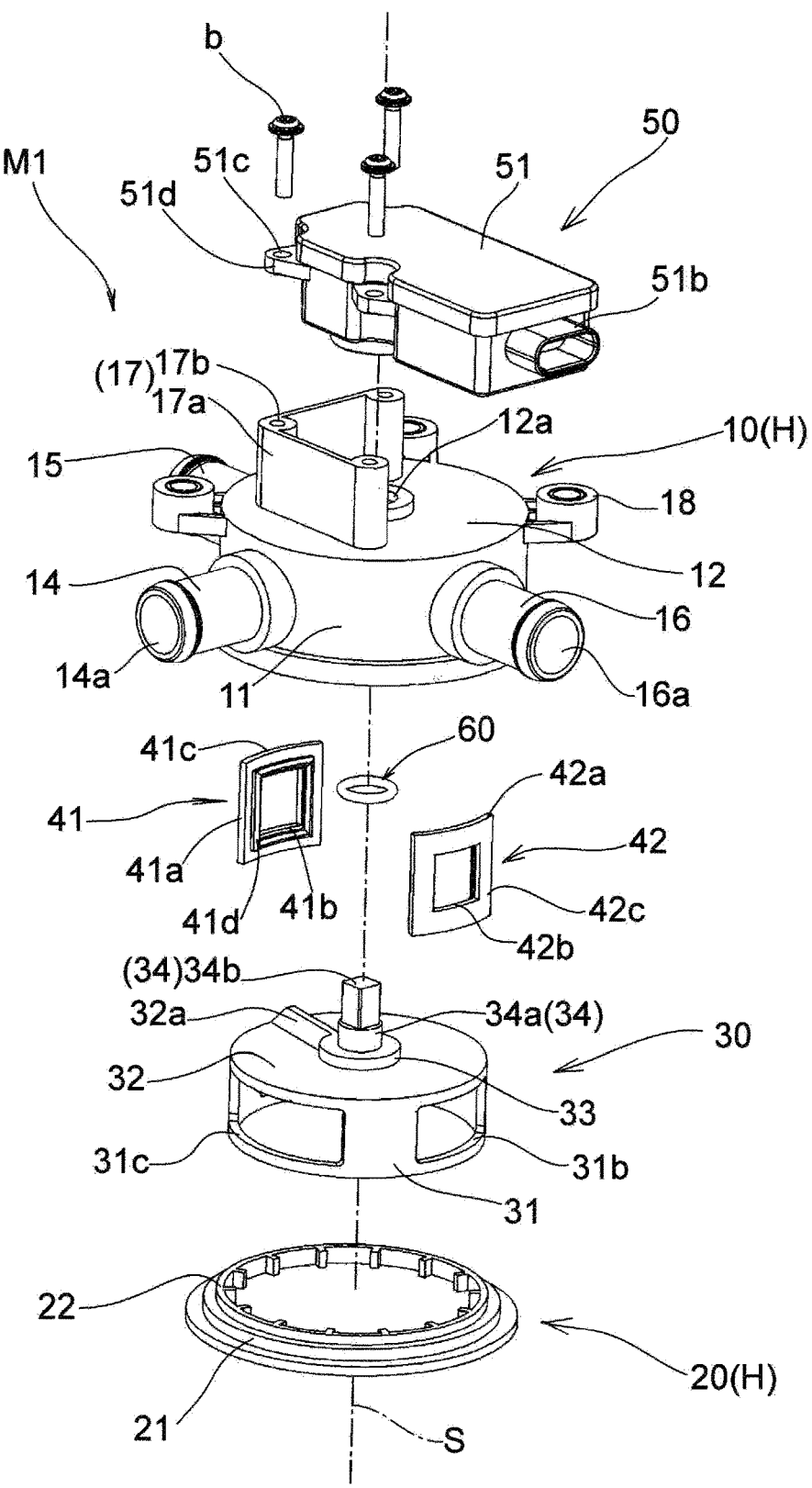
FIG. 4 is an exploded perspective view of the valve device according to the first embodiment viewed from one side in the axial direction.
Figure 5:
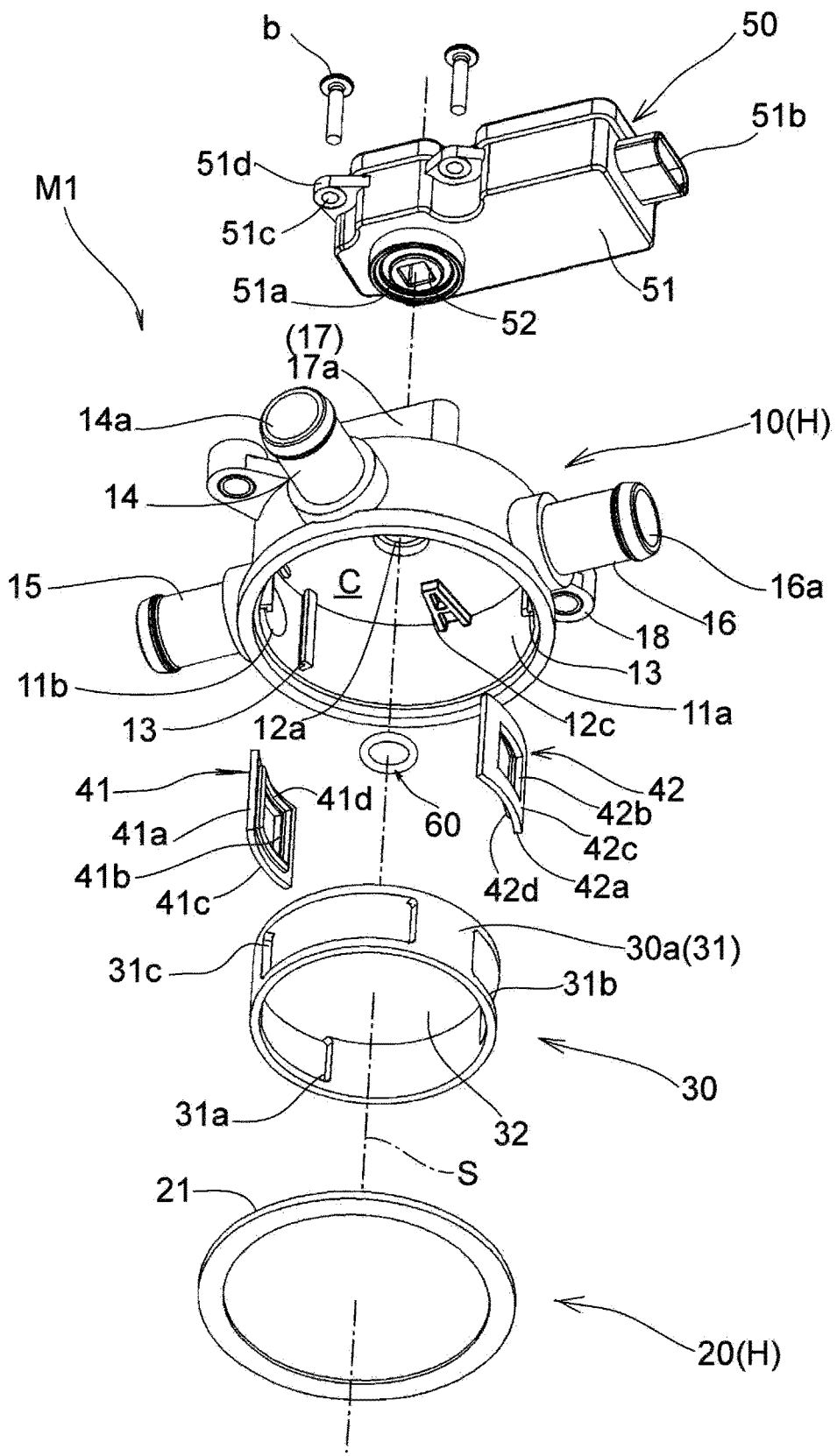
FIG. 5 is an exploded perspective view of the valve device according to the first embodiment viewed from the other side in the axial direction.

The seal member 41 is formed of rubber, resin material, etc. into a substantially rectangular annular shape, and, as shown in FIG. 4 to FIG. 6, the seal member 41 includes an attachment part 41a to be mounted to the mounting part 13 of the housing body 10, a rectangular opening 41b, a joint surface 41c, and a seal part 41d. The opening 41b is formed with an opening width in the circumferential direction Cd that is equal to the opening width (first opening width $Hw_1$) of the first outflow port 11b. The joint surface 41c is formed as a protruding curved surface having a radius of curvature centered on the axis S, and is in close contact with the inner peripheral surface 11a of the housing body 10. The seal part 41d is formed to be in slidable and close contact with the outer peripheral surface 30a of the valve body 30 in the radial direction perpendicular to the axis S. Then, the seal member 41 is arranged between the outer peripheral surface 30a of the valve body 30 and the inner peripheral surface 11a of the housing H around the first outflow port 11b, and seals between the outer peripheral surface 30a and the inner peripheral surface 11a.

The seal member 42 is formed of rubber, resin material, etc. into a substantially rectangular annular shape, and, as shown in FIG. 4 to FIG. 6, the seal member 42 includes an attachment part 42a to be mounted to the mounting part 13 of the housing body 10, a rectangular opening 42b, a joint surface 42c, and a seal part 42d. The opening 42b is formed with an opening width in the circumferential direction Cd that is equal to the opening width (second opening width $Hw_3$) of the second outflow port 11c. The joint surface 42c is formed as a protruding curved surface having a radius of curvature centered on the axis S and is in close contact with the inner peripheral surface 11a of the housing body 10. The seal part 42d is formed to be in slidable and close contact with the outer peripheral surface 30a of the valve body 30 in the radial direction perpendicular to the axis S. Then, the seal member 42 is arranged between the outer peripheral surface 30a of the valve body 30 and the inner peripheral surface 11a of the housing H around the second outflow port 11c, and seals between the outer peripheral surface 30a and the inner peripheral surface 11a.

Herein, since the first outflow port 11b and the second outflow port 11c have the same shape, and the first outflow communication port 31a and the second outflow communication port 31b have the same shape, the seal member 41 and the seal member 42 are provided as seal members having the same shape.

The drive unit 50 is, for example, a DC motor including a reduction gear, a stepping motor, etc., and, as shown in FIG. 1, FIG. 3, FIG. 4, and FIG. 5, the drive unit 50 includes a body case 51, a rotor 52 arranged in the body case 51, and a yoke (not shown) and a coil (not shown) arranged in the body case 51. Herein, the rotor 52 is a rotor having permanent magnets, a gear of a reduction gear train, etc. The body case 51 includes an opening 51a into which the rotating shaft 34 of the valve body 30 may be inserted, a connector 51b for electrical connection, and three boss parts 51d including circular holes 51c through which the screws b to be fastened to the fixing part 17 (female screw holes 17b) of the housing body 10 are passed.

The annular seal member 60 is formed of rubber, resin material, etc. and is fitted into the annular recess 12b of the housing body 10 to serve to seal around the rotating shaft 34 (columnar part 34a) of the valve body 30. Various ring seals in an O-shape, X-shape, and V-shape may be used as the annular seal member 60.

Next, an operation of the valve device M1 according to the first embodiment will be described with reference to FIG. 6 to FIG. 10. First, assuming that the state shown in FIG. 6 is an initial position, at the initial position, the inflow port 11d is fully opened, the first outflow port 11b is fully opened, and the second outflow port 11c is also fully opened. This state is a fully open-fully open mode. Thus, the fluid guided through the inflow passage 14a flows from the inflow port 11d into the internal passage Ip through the inflow communication port 31c. Then, a part of the fluid in the internal passage Ip flows out from the first outflow port 11b through the first outflow communication port 31a and is supplied to a first fluid supply destination through the first outflow passage 15a. Another part of the fluid in the internal passage Ip flows out from the second outflow port 11c through the second outflow communication port 31b and is supplied to a second fluid supply destination through the second outflow passage 16a.

Figure 7:
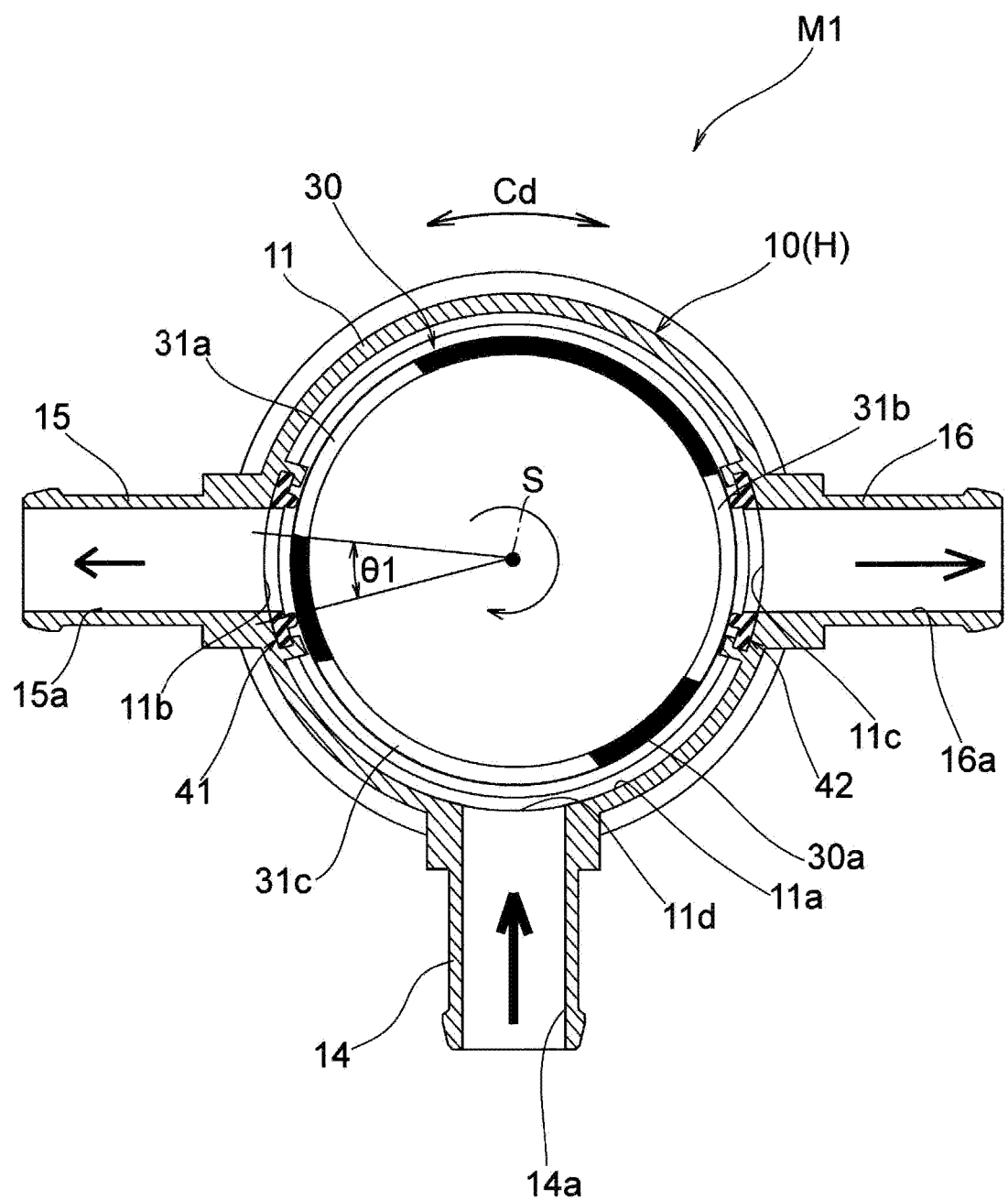
FIG. 7 is a cross-sectional view showing a throttle-fully open state in which the valve body rotates clockwise (arrow direction) by a predetermined angle from the fully open-fully open state shown in FIG. 6, and the first flow port (first outflow port) is throttled and the second flow port (second outflow port) is maintained fully opened.

Subsequently, upon rotation of the valve body 30 clockwise by an angle θ1 (e.g., about degrees) from the state shown in FIG. 6, as shown in FIG. 7, the inflow port 11d is maintained fully opened, the first outflow port 11b is throttled, and the second outflow port 11c is maintained fully opened. This state is a throttle-fully open mode. Thus, a part of the fluid in the internal passage Ip flows out at a small flow rate from the first outflow port 11b, of which the opening amount is narrowed, through the first outflow communication port 31a, and is supplied to the first fluid supply destination through the first outflow passage 15a. Another part of the fluid in the internal passage Ip flows out at a substantially same flow rate from the second outflow port 11c through the second outflow communication port 31b, and is supplied to the second fluid supply destination through the second outflow passage 16a.

Figure 8:
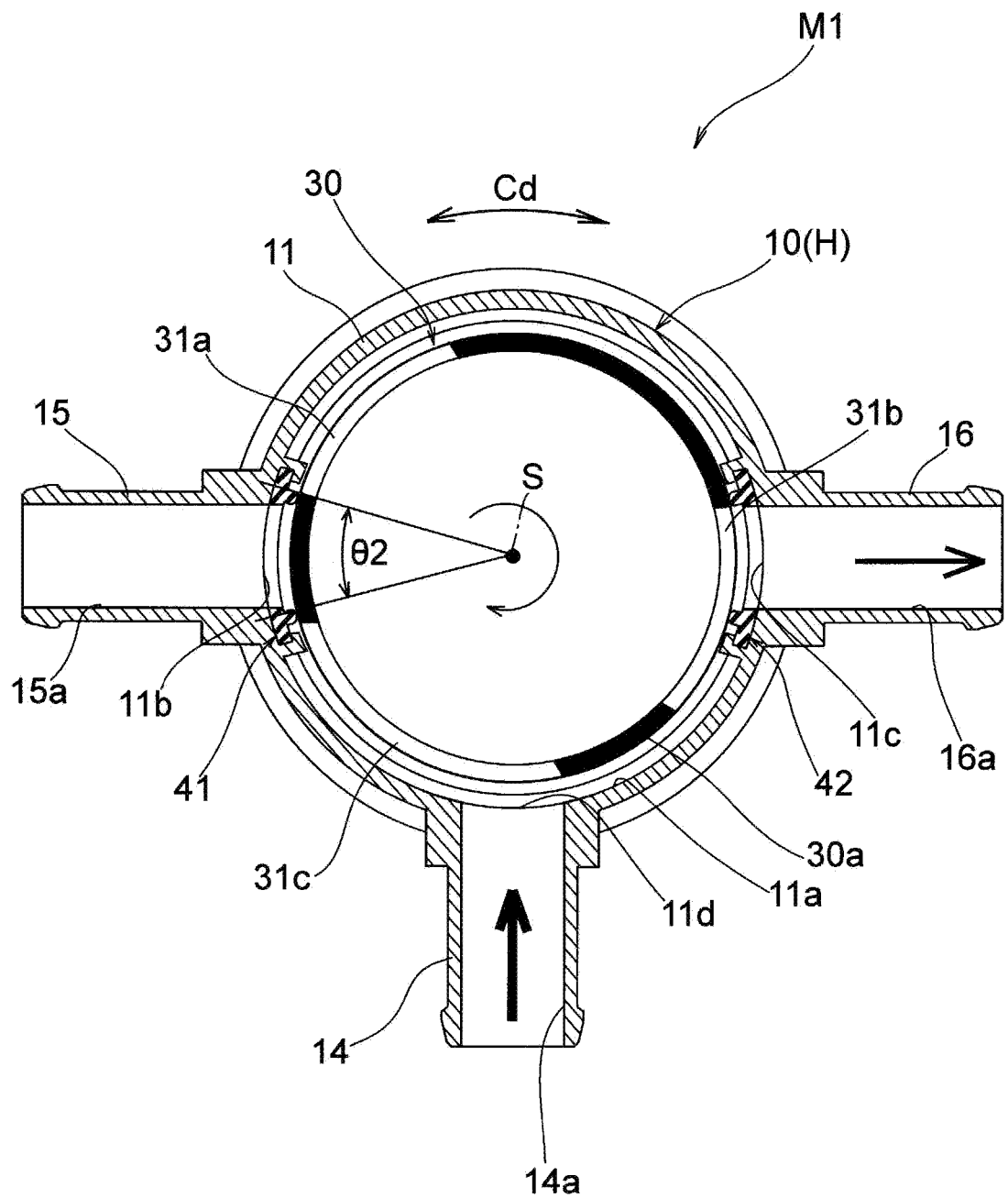
FIG. 8 is a cross-sectional view showing a fully close-fully open state in which the valve body rotates clockwise (arrow direction) by a predetermined angle from the throttle-fully open state shown in FIG. 7, and the first flow port (first outflow port) is closed and the second flow port (second outflow port) is maintained fully opened.

Subsequently, upon rotation of the valve body 30 clockwise from the state shown in FIG. 7 (an angle θ2, .e.g., about 30 degrees, from the state shown in FIG. 6), as shown in FIG. 8, the inflow port 11d is maintained fully opened, the first outflow port 11b is fully closed, and the second outflow port 11c is maintained fully opened. This state is a fully close-fully open mode. Thus, without flowing out from the first outflow port 11b, the fluid in the internal passage Ip flows out from the second outflow port 11c through the second outflow communication port 31b and is supplied to the second fluid supply destination through the second outflow passage 16a. That is, in the process from the state shown in FIG. 6 to the state shown in FIG. 8, the flow rate of the first outflow port 11b can be changed without changing the flow rate of the second outflow port 11c.

Figure 9:
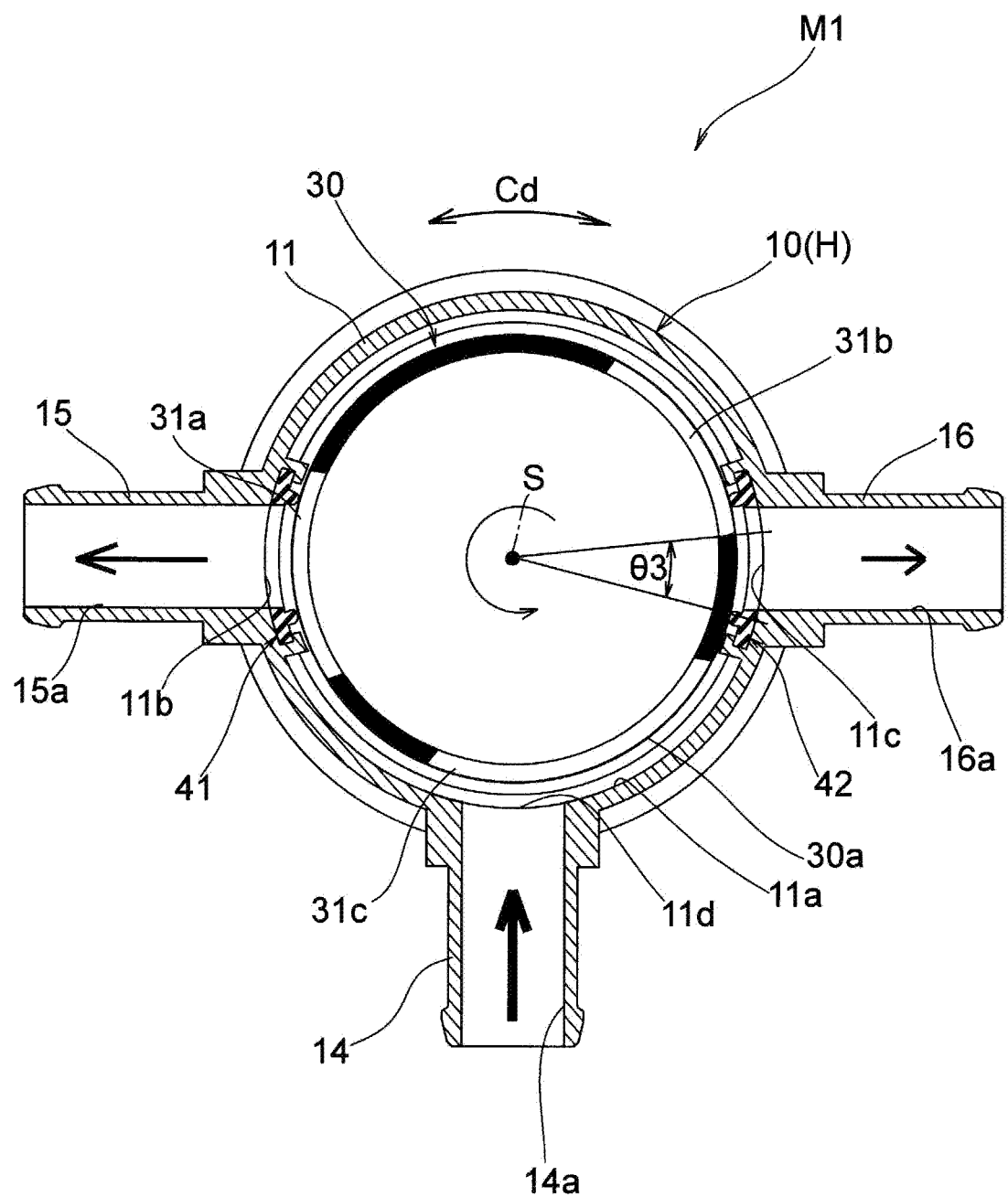
FIG. 9 is a cross-sectional view showing a fully open-throttle state in which the valve body rotates counterclockwise (arrow direction) by a predetermined angle from the fully open-fully open state shown in FIG. 6, and the first flow port (first outflow port) is maintained fully opened and the second flow port (second outflow port) is throttled.

On the other hand, upon rotation of the valve body 30 counterclockwise by an angle θ3 (e.g., about 20 degrees) from the state shown in FIG. 6, as shown in FIG. 9, the inflow port 11d is maintained fully opened, the first outflow port 11b is maintained fully opened, and the second outflow port 11c is throttled. This state is a fully open-throttle mode. Thus, a part of the fluid in the internal passage Ip flows out at a substantially same flow rate from the first outflow port 11b through the first outflow communication port 31a and is supplied to the first fluid supply destination through the first outflow passage 15a. Another part of the fluid in the internal passage Ip flows out at a small flow rate from the second outflow port 11c, of which the opening amount is narrowed, through the second outflow communication port 31b, and is supplied to the second fluid supply destination through the second outflow passage 16a.

Figure 10:
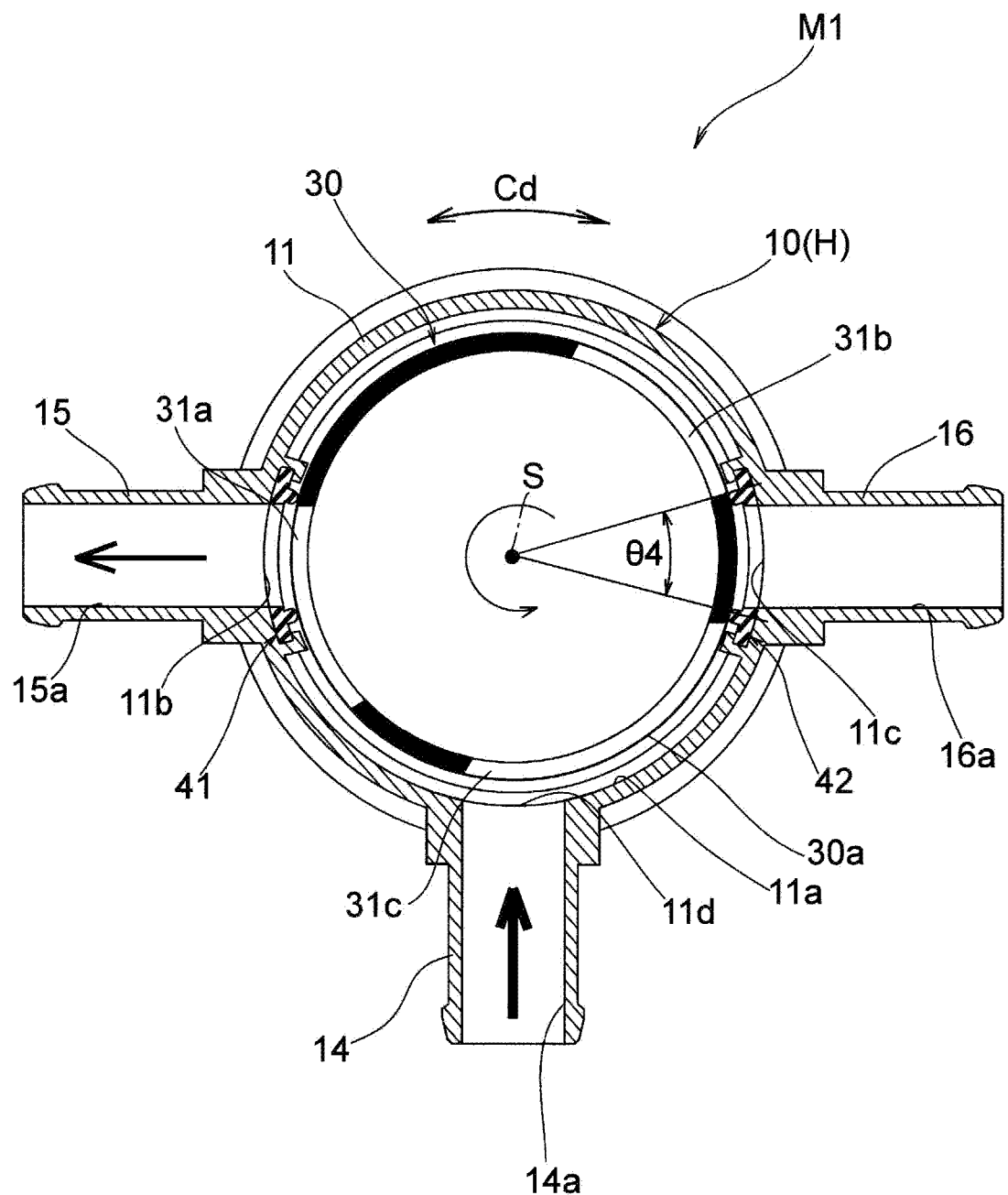
FIG. 10 is a cross-sectional view showing a fully open-fully close state in which the valve body rotates counterclockwise (arrow direction) by a predetermined angle from the fully open-throttle state shown in FIG. 9, and the first flow port (first outflow port) is maintained fully opened and the second flow port (second outflow port) is closed.

Subsequently, upon rotation of the valve body 30 counterclockwise from the state shown in FIG. 9 (an angle θ4, e.g., about 30 degrees, counterclockwise from the state shown in FIG. 6), as shown in FIG. 10, the inflow port 11d is maintained fully opened, the first outflow port 11b is maintained fully opened, and the second outflow port 11c is fully closed. This state is a fully open-fully close mode. Thus, without flowing out from the second outflow port 11c, the fluid in the internal passage Ip flows out from the first outflow port 11b through the first outflow communication port 31a and is supplied to the first fluid supply destination through the first outflow passage 15a. That is, in the process from the state shown in FIG. 6 to the states shown in FIG. 9 and FIG. 10, the flow rate of the second outflow port 11c can be changed without changing the flow rate of the first outflow port 11b.

According to the valve device M1 according to the first embodiment having the above configuration, the valve body 30 includes the internal passage Ip, the first outflow communication port 31a, and the second outflow communication port 31b. The internal passage Ip communicates with the inflow port 11d. The first outflow communication port 31a expands in one direction in the circumferential direction Cd continuously with a region facing the first outflow port 11b to allow communication between the internal passage Ip and the first outflow port 11b, and has an opening width $Vw_1$ larger than the first opening width $Hw_1$. The second outflow communication port 31b expands in the other direction in the circumferential direction Cd continuously with a region facing the second outflow port 11c to allow communication between the internal passage Ip and the second outflow port 11c, and has an opening width $Vw_2$ larger than the second opening width $Hw_2$. Accordingly, in the configuration including two outflow ports 11b and 11c, the flow rate of one outflow port 11c (11b) can be throttled without changing the flow rate of the other outflow port 11b (11c). Further, the relationship between the opening width $Vw_1$ of the first outflow communication port 31a, the opening width $Vw_2$ of the second outflow communication port 31b, the first opening width $Hw_1$ of the first outflow port 11b, and the second opening width $Hw_2$ of the second outflow port 11c is formed to satisfy $Vw_1 \geq Hw_1 + Hw_2$ and $Vw_2 \geq Hw_2 + Hw_1$. Accordingly, it is possible to set the throttle-fully open mode and the fully open-throttle mode in addition to the fully open-fully open mode, the fully close-fully open mode, and the fully open-fully close mode.

Further, by forming the first outflow port 11b and the second outflow port 11c plane-symmetrically with respect to the central plane Cf including the axis S and forming the first outflow communication port 31a and the second outflow communication port 31b plane-symmetrically with respect to the central plane Cf, the above-described operation modes can be easily set simply by rotating the valve body 30 in one direction (clockwise) or the other direction (counterclockwise). Further, by arranging the first outflow port 11b and the second outflow port 11c at positions separated by 180 degrees around the axis S, it is possible to easily arrange the first outflow communication port 31a and the second outflow communication port 31b for setting the above-described operation modes.

Further, the inflow port 11d is arranged to be opened to the inner peripheral surface 11a of the housing H, in particular, the first outflow port 11b and the second outflow port 11c are arranged at the same position in the axis S direction, the inflow port 11d is arranged at the same position as the first outflow port 11b and the second outflow port 11c in the axis S direction, and the valve body 30 includes the inflow communication port 31c having an opening width $Vw_3$ larger than the opening widths $Vw_1$ and $Vw_2$ of the first outflow communication port 31a and the second outflow communication port 31b to allow communication between the inflow port 11d and the internal passage Ip. Accordingly, in addition to be capable of setting the above-described operation modes, the housing H can be reduced in size in the axis S direction, and thus the valve device M1 can be downsized as a whole.

Further, by arranging the valve body 30 with a gap with respect to the inner peripheral surface 11a of the housing H and including the annular seal members 41 and 42 arranged between the outer peripheral surface 30a of the valve body 30 and the inner peripheral surface 11a of the housing H around the first outflow port 11b and the second outflow port 11c, the fluid can be more reliably prevented from leaking from the regions of the first outflow port 11b and the second outflow port 11c, and the flow rate can be adjusted more accurately.

Figure 11:
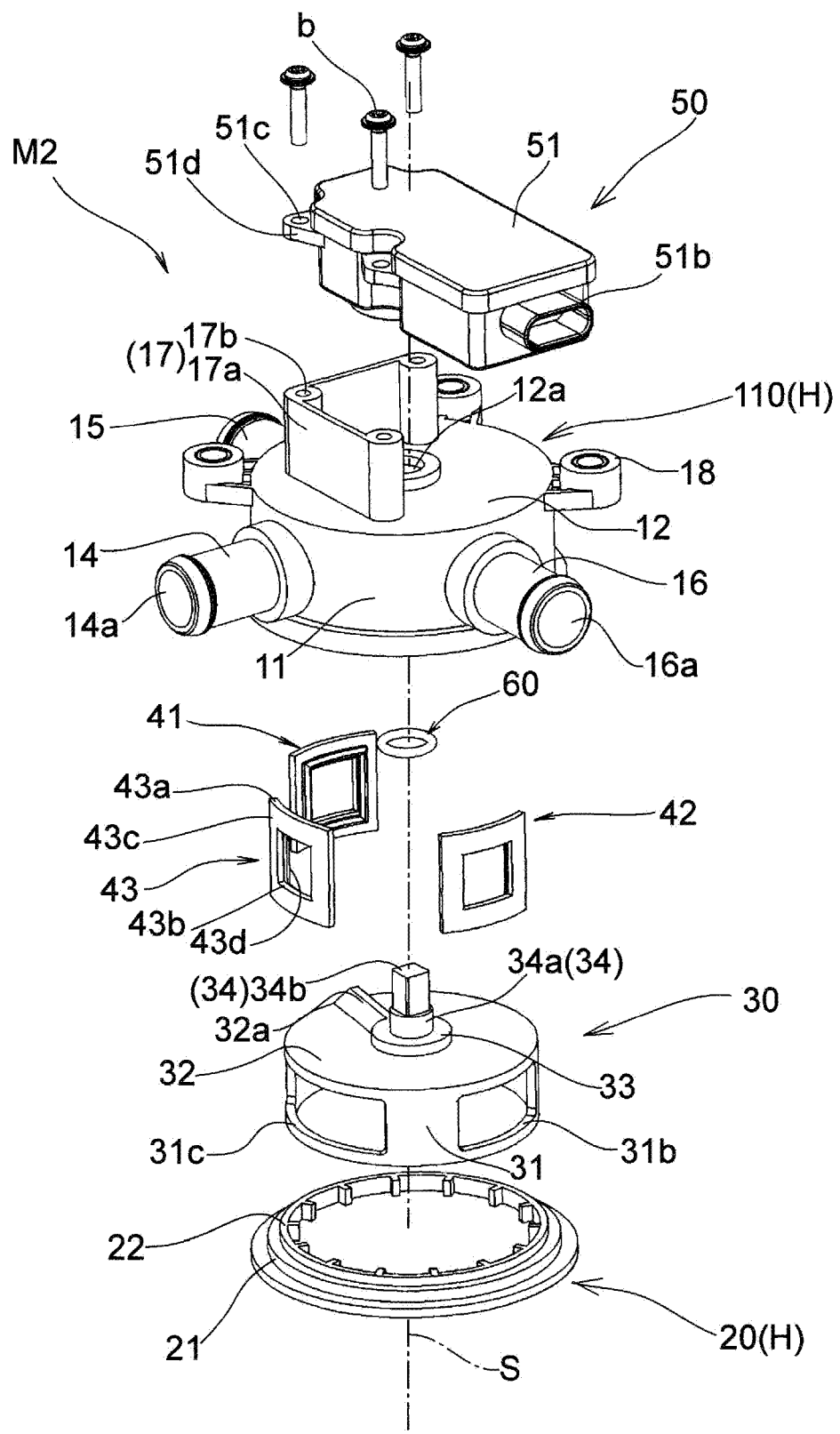
FIG. 11 is an exploded perspective view of a valve device according to a second embodiment of the disclosure viewed from one side in the axial direction.
Figure 12:
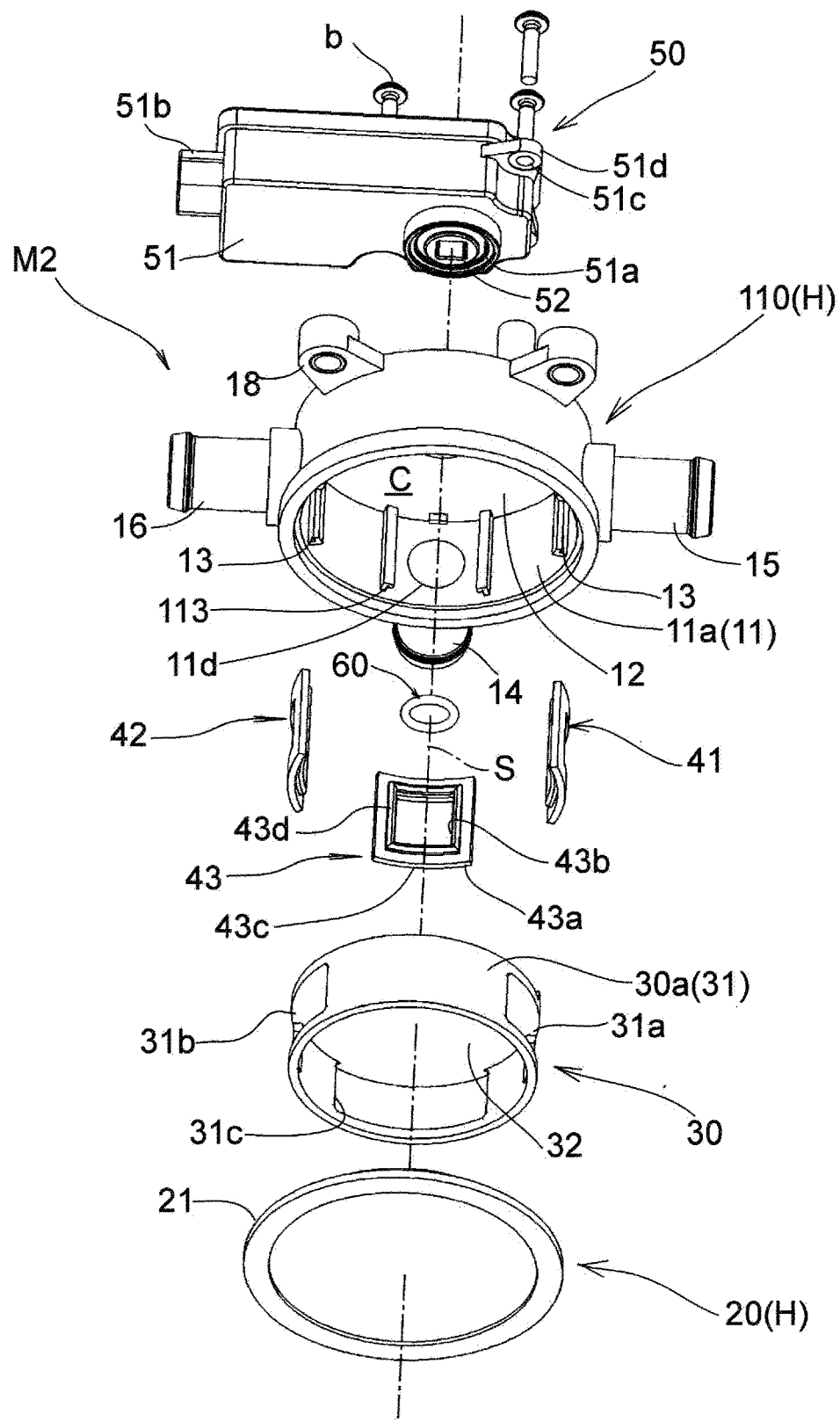
FIG. 12 is an exploded perspective view of the valve device according to the second embodiment viewed from the other side in the axial direction.
Figure 13:
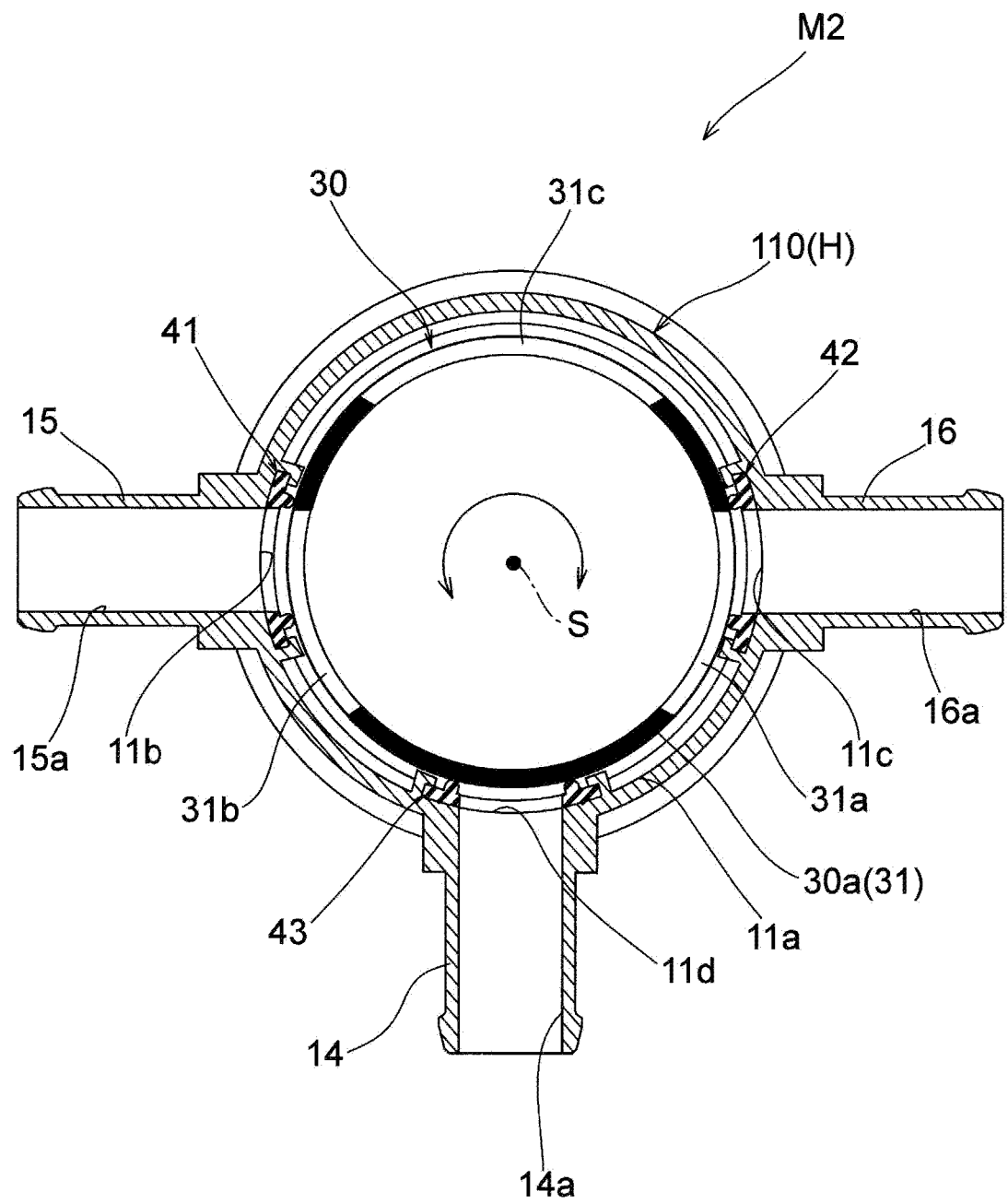
FIG. 13 is a cross-sectional view of the valve device according to the second embodiment taken along a plane that is perpendicular to the axis and passes through a center line of the first flow port (first outflow port) and the second flow port (second outflow port), showing a state substantially equivalent to a fully close-fully close state in which the first flow port (first outflow port) and the second flow port (second outflow port) are fully opened and a main flow port (inflow port) is closed.
Figure 14:
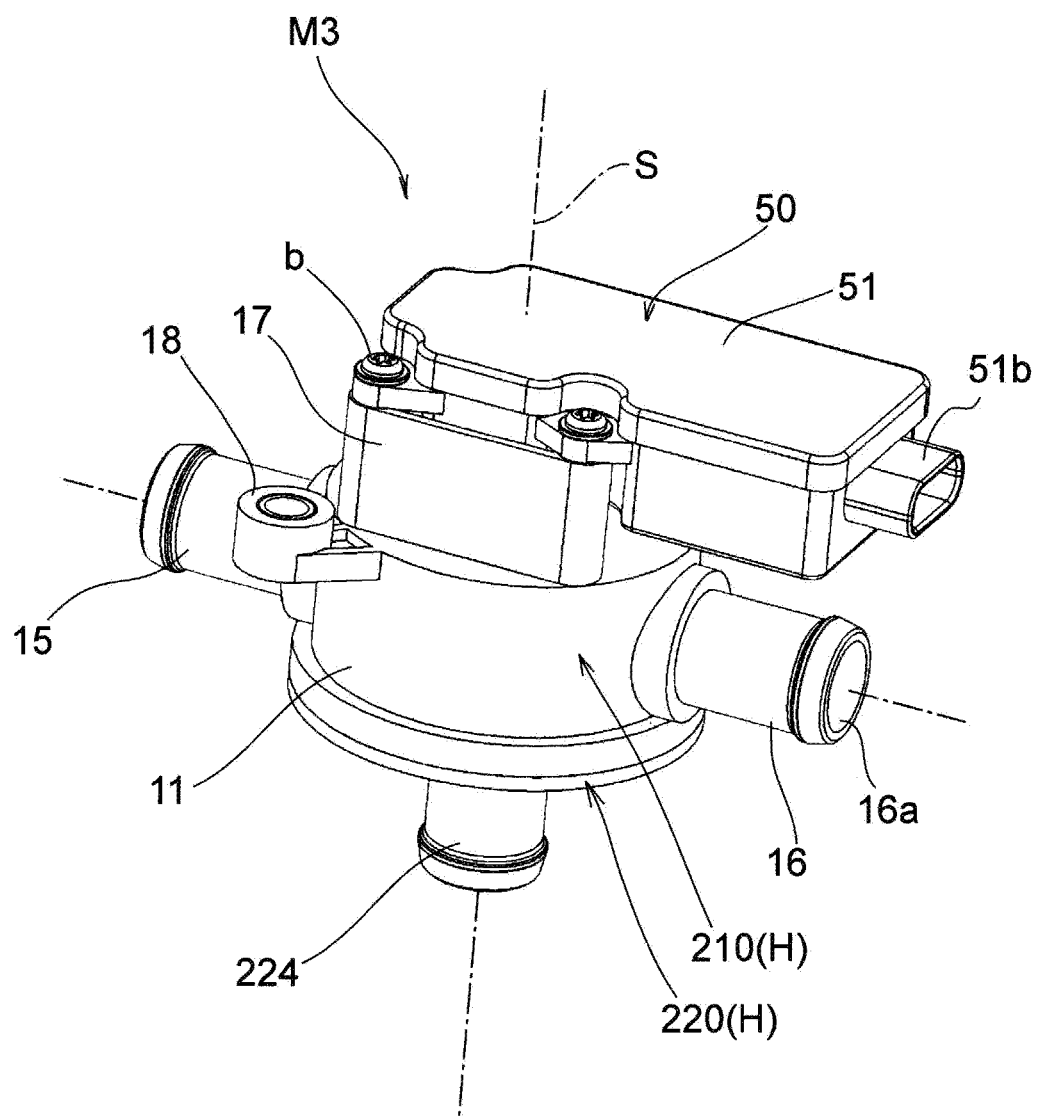
FIG. 14 is an external perspective view showing a valve device according to a third embodiment of the disclosure viewed from one side of the housing in the axial direction along the axis which is the center of rotation of the valve body.
Figure 15:
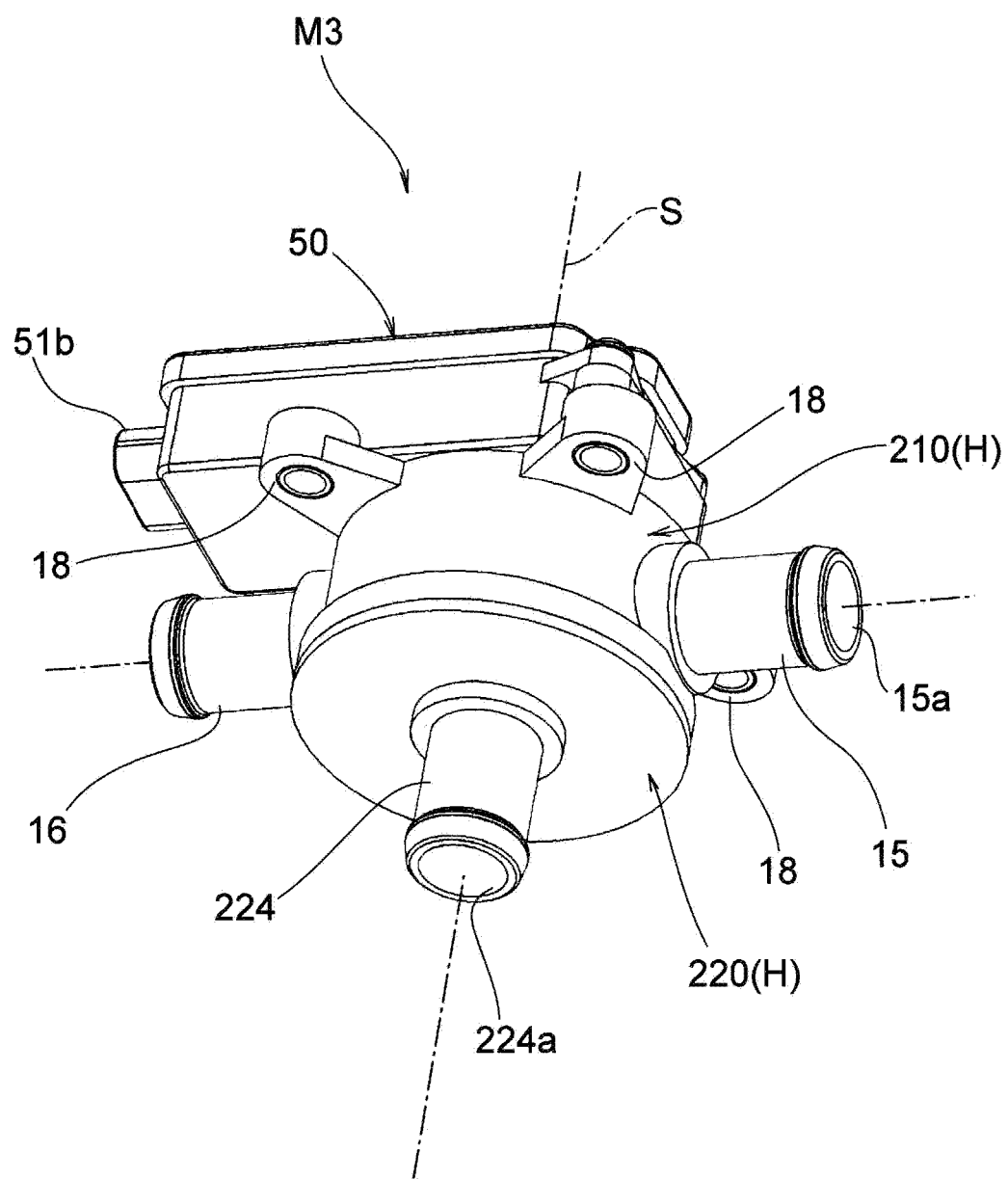
FIG. 15 is an external perspective view showing the valve device according to the third embodiment viewed from the other side of the housing in the axial direction.
Figure 16:
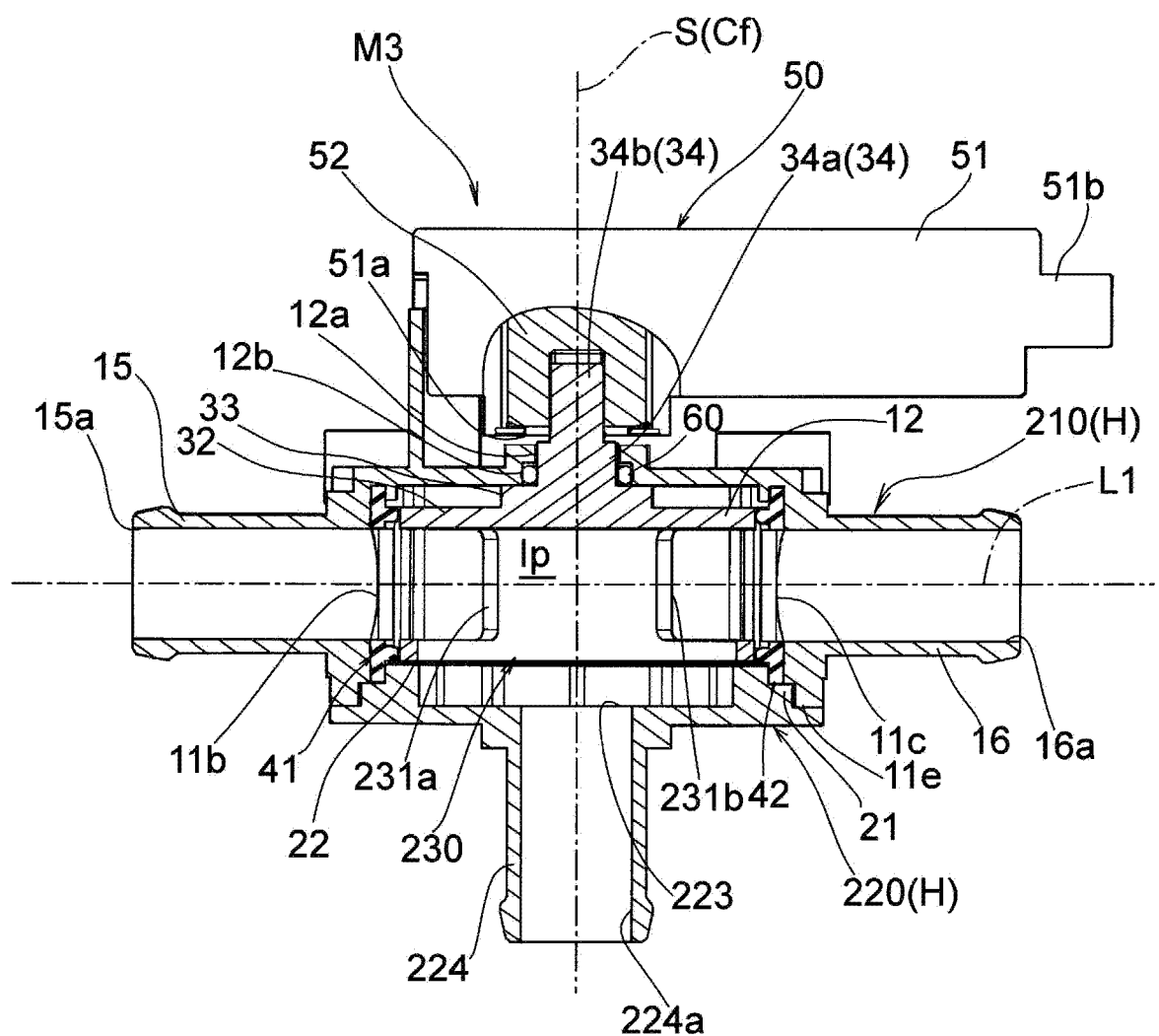
FIG. 16 is a cross-sectional view of the valve device according to the third embodiment taken along a plane including an axis which is the center of rotation of the valve body.

FIG. 11 to FIG. 13 show a valve device M2 according to a second embodiment of the disclosure, which is similar to the valve device M1 according to the first embodiment except that the housing body 10 is changed to a housing body 110, and a seal member 43 is added. The same configurations will be labeled with the same reference signs, and descriptions thereof will be omitted. The valve device M2 according to the second embodiment includes a housing body 110 and a housing cover 20 as a housing H, a valve body 30, three seal members 41, 42, and 43, a drive unit 50 as a drive source, an annular seal member 60, and three screws b.

The housing body 110 is formed of a material such as a resin material, metal, or alloy, and includes a cylindrical part 11 centered on the axis S, a top plate part 12, two mounting parts 13, one mounting part 113, an inflow connection pipe 14, a first outflow connection pipe 15, a second outflow connection pipe 16, a fixing part 17, and three boss parts 18. The one mounting part 113 serves for mounting the seal member 43 in a region corresponding to the inflow port 11d, and is formed as ridges that protrude inward from the inner peripheral surface 11a, defines fitting grooves facing each other in the circumferential direction Cd, and extend in the axis S direction. The mounting part 113 positions and holds the seal member 43 inserted from an opening defined on the inner side of the coupling part 11e of the cylindrical part 11 around the inflow port 11d.

The seal member 43 is formed of rubber, resin material, etc. into a substantially rectangular annular shape, and includes an attachment part 43a to be mounted to the mounting part 113 of the housing body 110, a rectangular opening 43b, a joint surface 43c, and a seal part 43d. The opening 43b is formed with an opening width in the circumferential direction Cd that is equal to the opening width $Hw_3$ of the inflow port 11d. The joint surface 43c is formed as a protruding curved surface having a radius of curvature centered on the axis S, and is in close contact with the inner peripheral surface 11a of the housing body 110. The seal part 43d is formed to be in slidable and close contact with the outer peripheral surface 30a of the valve body 30 in the radial direction perpendicular to the axis S. Then, the seal member 43 is arranged between the outer peripheral surface 30a of the valve body 30 and the inner peripheral surface 11a of the housing H around the inflow port 11d and seals between the outer peripheral surface 30a and the inner peripheral surface 11a.

Next, an operation of the valve device M2 according to the second embodiment will be described with reference to FIG. 13. As described with reference to FIG. 6 to FIG. 10, the operation of the valve device M1 according to the first embodiment is performed in five operation modes, including the fully open-fully open mode, the throttle-fully open mode, the fully close-fully open mode, the fully open-throttle mode, and the fully open-fully close mode. In addition to the above-described five operation modes, in the valve device M2 according to the second embodiment, as shown in FIG. 13, upon rotation of the valve body 30 clockwise or counterclockwise by about 180 degrees (about 147 degrees to 213 degrees) from the initial position shown in FIG. 6, the inflow port 11d is fully closed with the first outflow port 11b being fully opened and the second outflow port 11c being fully opened. In this state, since the inflow port 11d located on the upstream side of the valve body 30 is fully closed and the fluid does not flow in, the fluid cannot flow out from the first outflow port 11b and the second outflow port 11c. In other words, this state is substantially equivalent to a fully close-fully close mode in which the first outflow port 11b and the second outflow port 11c are fully closed.

According to the valve device M2 according to the second embodiment, in addition to the action and effect of the valve device M1 according to the first embodiment, an operation mode equivalent to the fully close-fully close mode can be added. Thus, in the application target object, supply of the fluid to the first fluid supply destination and supply of the fluid to the second fluid supply destination can be completely stopped at the same time.

FIG. 14 to FIG. 25 show a valve device M3 according to a third embodiment of the disclosure, which is similar to the valve device M1 according to the first embodiment except that a housing body 210, a housing cover 220, and a valve body 230 are adopted instead of the housing body 10, the housing cover 20, and the valve body 30. The same configurations will be labeled with the same reference signs, and descriptions thereof will be omitted. The valve device M3 according to the third embodiment includes a housing body 210 and a housing cover 220 as a housing H, a valve body 230, two seal members 41 and 42, a drive unit 50 as a drive source, an annular seal member 60, and three screws b.

The housing body 210 is formed of a material such as a resin material, metal, or alloy, and includes a cylindrical part 11 centered on the axis S, a top plate part 12, two mounting parts 13, a first outflow connection pipe 15, a second outflow connection pipe 16, a fixing part 17, and three boss parts 18. As shown in FIG. 3 and FIG. 6, the cylindrical part 11 includes a first outflow port 11b and a second outflow port 11c which are opened apart in the circumferential direction Cd at the inner peripheral surface 11a, and a coupling part 11e.

The housing cover 220 is formed of the same material as the housing body 210 into a disk shape, and includes a fitting part 21 fitted to the coupling part 11e of the housing body 210, a support part 22 that supports the valve body 230 in the axis S direction, an inflow port 223 as a main flow port, and an inflow connection pipe 224 as a main connection pipe. The inflow port 223 is a region through which a fluid flows in, forms a circular opening centered on the axis S in a central region including the axis S and having a passage area equivalent to that of the first outflow port 11b and the second outflow port 11c, and leads to an inflow passage 224a as a main passage defined by the inflow connection pipe 224. The inflow connection pipe 224 connects a fluid introduction pipe of the application target object, extends in the axis S direction, and defines the inflow passage 224a which leads to the inflow port 223. Then, with the valve body 230 accommodated in the accommodation chamber C, the housing cover 220 is coupled to the housing body 210 to close the accommodation chamber C.

Figure 17:
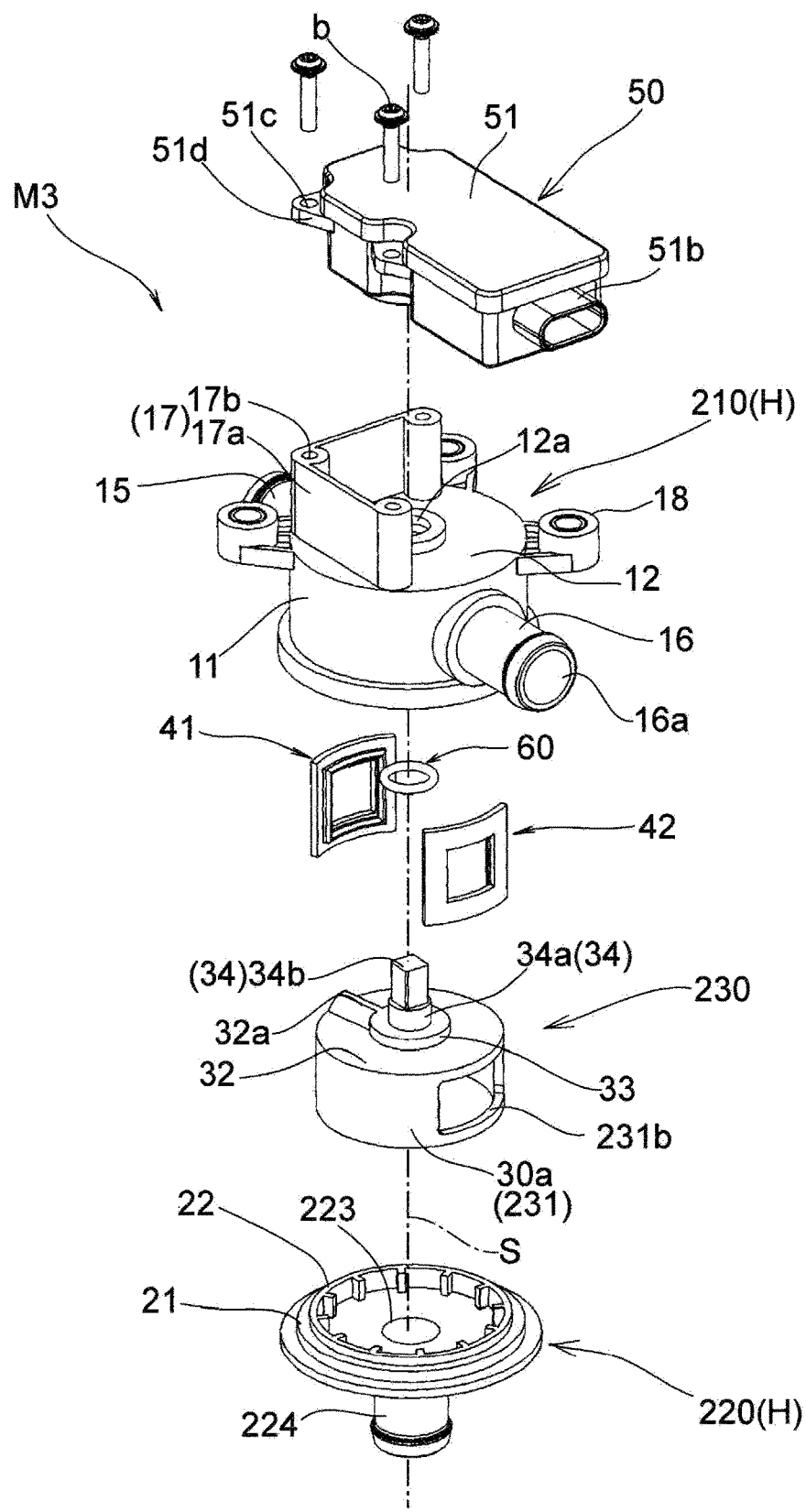
FIG. 17 is an exploded perspective view of the valve device according to the third embodiment viewed from one side in the axial direction.
Figure 18:
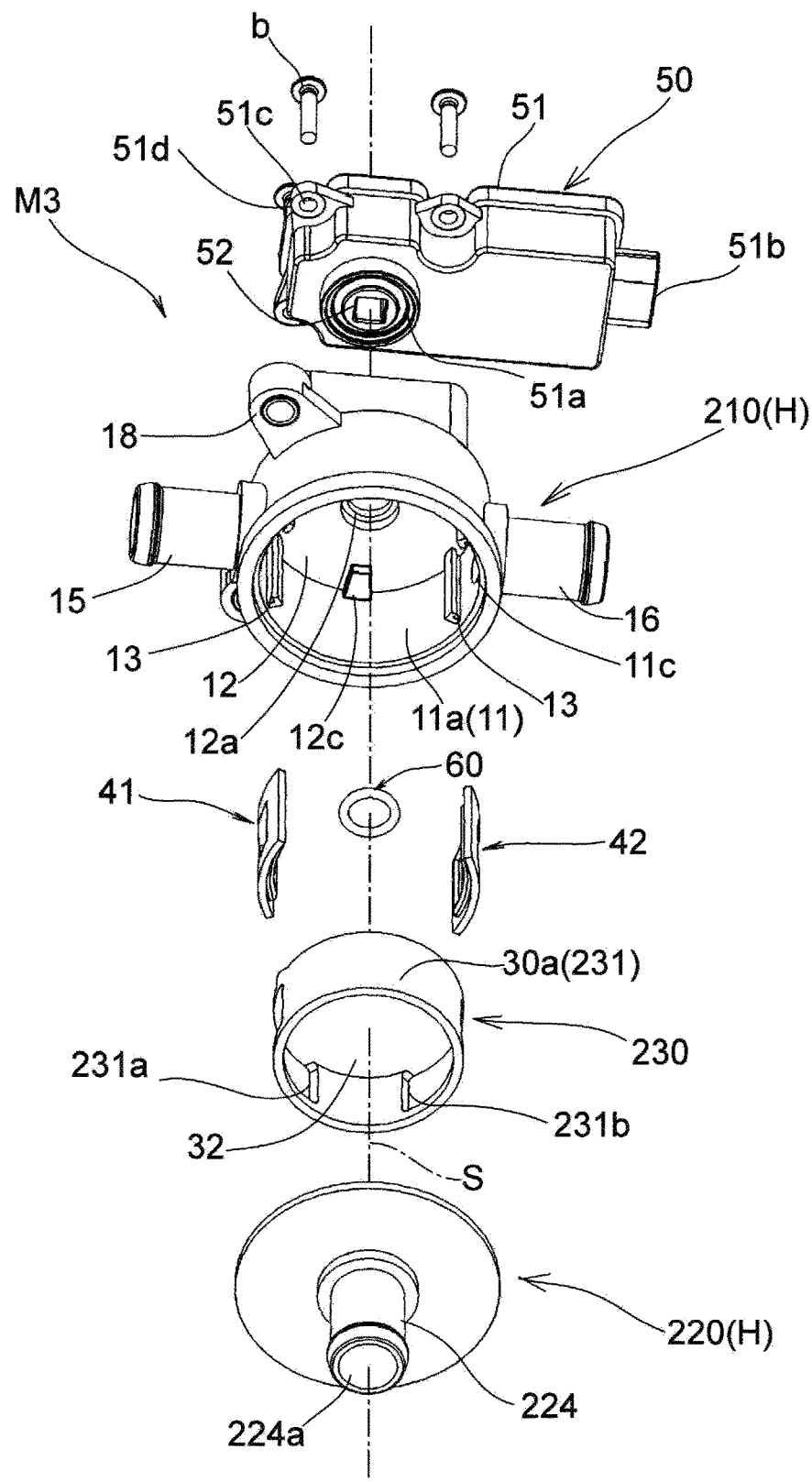
FIG. 18 is an exploded perspective view of the valve device according to the third embodiment viewed from the other side in the axial direction.
Figure 19:
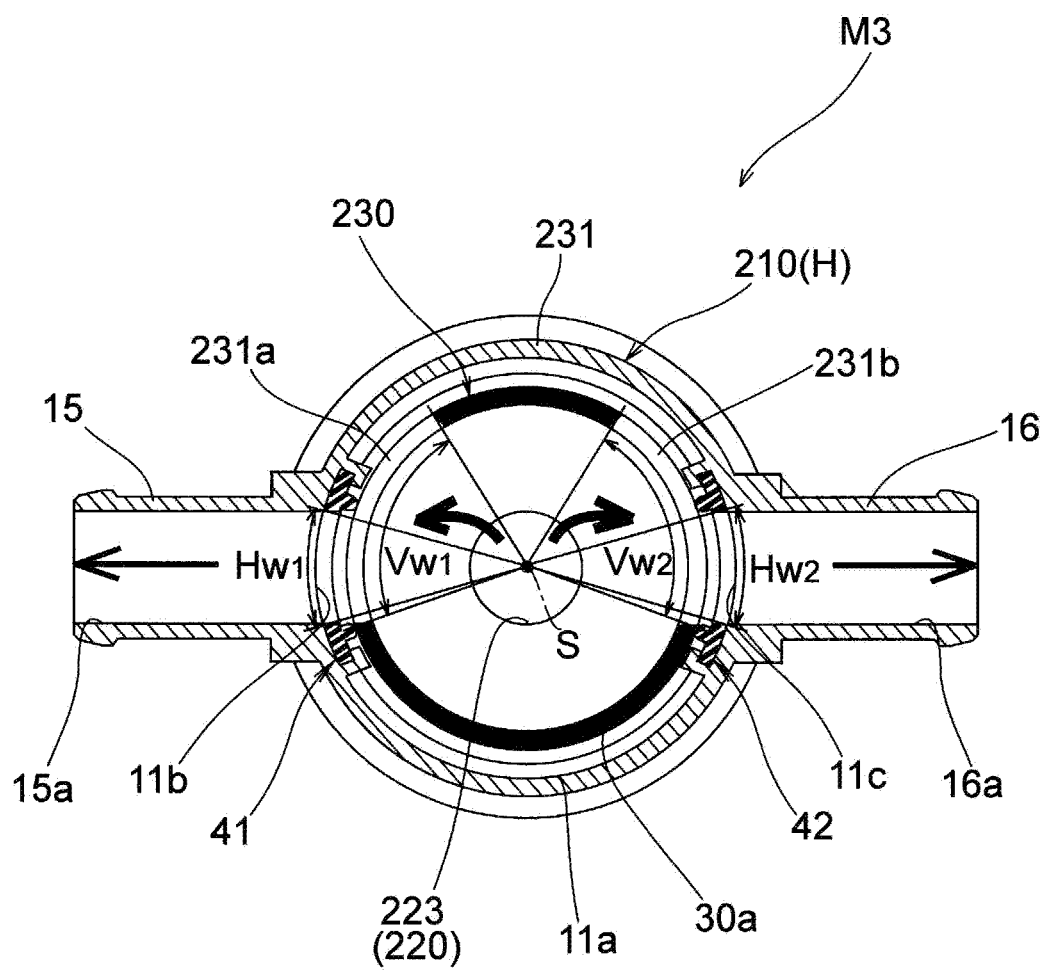
FIG. 19 is a cross-sectional view showing the valve device according to the third embodiment taken along a plane that is perpendicular to the axis and passes through a center line of the first flow port (first outflow port) and the second flow port (second outflow port), showing a fully open-fully open state in which the first flow port (first outflow port) and the second flow port (second outflow port) are fully opened.

The valve body 230 is formed of a material such as a resin material, metal, or alloy into a cylindrical shape, and, as shown in FIG. 17 to FIG. 19, includes a cylindrical part 231 defining an outer peripheral surface 30a centered on the axis S and an internal passage Ip, a top plate part 32 closing one end part of the cylindrical part 231 in the axis S direction, a protruding disk part 33 centered on the axis S formed continuously with the top plate part 32, and a rotating shaft 34 centered on the axis S formed continuously with the protruding disk part 33.

As shown in FIG. 19, the cylindrical part 231 includes a first outflow communication port 231a as a first communication port and a second outflow communication port 231b as a second communication port. The first outflow communication port 231a is formed as a substantially rectangular curved opening that is arranged at the same position as the first outflow port 11b in the axis S direction to allow communication between the internal passage Ip and the first outflow port 11b, and passes from one end side over the other end side of the first outflow port 11b in the circumferential direction Cd to extend in one direction in the circumferential direction Cd. That is, the first outflow communication port 231a is formed as an elongated opening that expands in one direction (clockwise in FIG. 19) in the circumferential direction Cd continuously with a region facing the first outflow port 11b, and has an opening width $Vw_1$ larger than the first opening width $Hw_1$ of the first outflow port 11b.

The second outflow communication port 231b is formed as a substantially rectangular curved opening that is arranged at the same position as the second outflow port 11c in the axis S direction to allow communication between the internal passage Ip and the second outflow port 11c, and passes from one end side over the other end side of the second outflow port 11c in the circumferential direction Cd to extend in the other direction of the circumferential direction Cd. That is, the second outflow communication port 231b is formed as an elongated opening that expands in the other direction (counterclockwise in FIG. 19) in the circumferential direction Cd continuously with a region facing the second outflow port 11c, and has an opening width $Vw_2$ larger than the second opening width $Hw_2$ of the second outflow port 11c.

Herein, upon conversion of each opening width in the circumferential direction Cd into a central angle (included angle) centered on the axis S, the first opening width $Hw_1$ of the first outflow port 11b is set to about 30 degrees to 32 degrees, the second opening width $Hw_2$ of the second outflow port 11c is set to about 30 degrees to 32 degrees, the opening width $Vw_1$ of the first outflow communication port 231a is set to about 76 degrees to 78 degrees, and the opening width $Vw_2$ of the second outflow communication port 231b is set to about 76 degrees to 78 degrees. Further, the first outflow communication port 231a and the second outflow communication port 231b are formed plane-symmetrically with respect to the central plane Cf including the axis S.

Next, an operation of the valve device M3 according to the third embodiment will be described with reference to FIG. 19 to FIG. 25. In the valve device M3, the inflow port 223 is in a constantly fully opened state. First, assuming that the state shown in FIG. 19 is an initial position, at the initial position, the first outflow port 11b is fully opened and the second outflow port 11c is also fully opened. This state is a fully open-fully open mode. Thus, the fluid guided through the inflow passage 224a flows from the inflow port 223 into the internal passage Ip of the valve body 230. A part of the fluid in the internal passage Ip flows out from the first outflow port 11b through the first outflow communication port 231a and is supplied to the first fluid supply destination through the first outflow passage 15a. Another part of the fluid in the internal passage Ip flows out from the second outflow port 11c through the second outflow communication port 231b and is supplied to the second fluid supply destination through the second outflow passage 16a.

Figure 20:
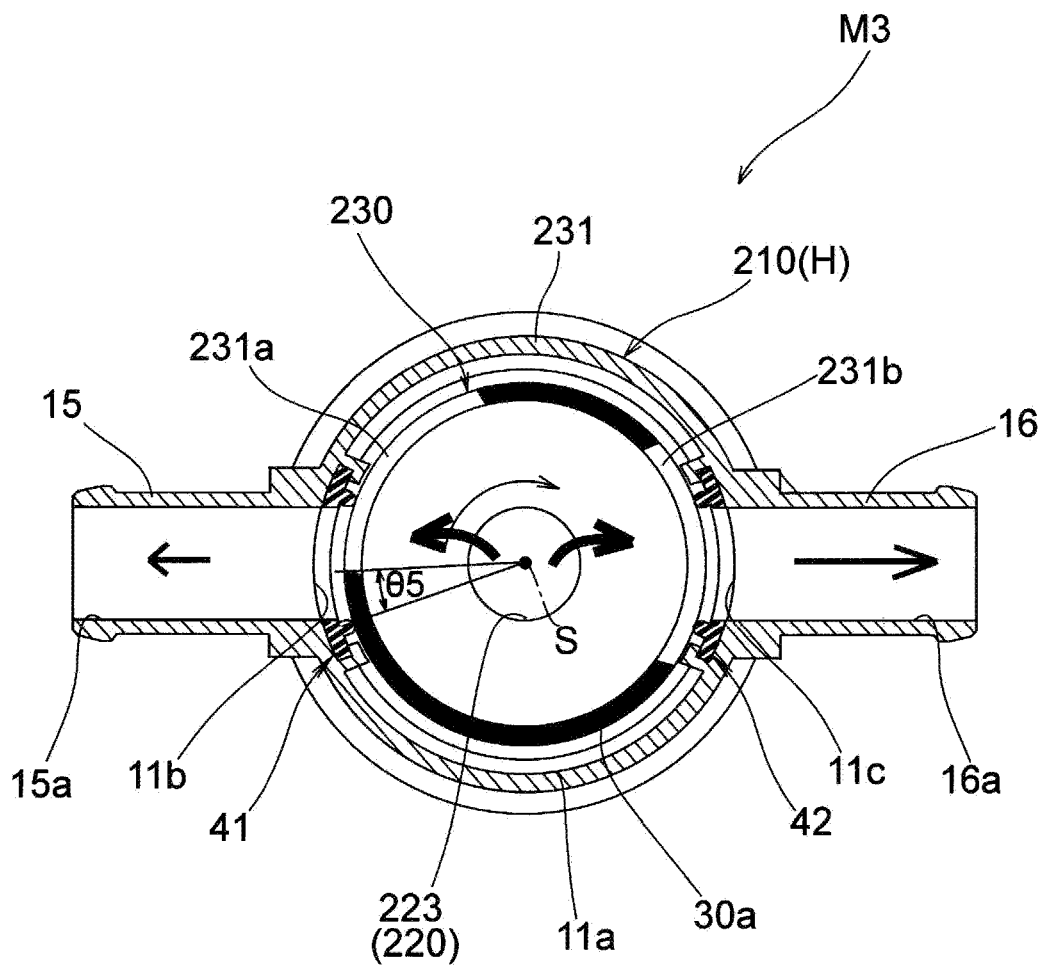
FIG. 20 is a cross-sectional view showing a throttle-fully open state in which the valve body rotates clockwise (arrow direction) by a predetermined angle from the fully open-fully open state shown in FIG. 19, and the first flow port (first outflow port) is throttled and the second flow port (second outflow port) is maintained fully opened.

Subsequently, upon rotation of the valve body 230 clockwise by an angle θ5 (e.g., about 16 degrees) from the state shown in FIG. 19, as shown in FIG. 20, the first outflow port 11b is throttled, and the second outflow port 11c is maintained fully opened. This state is a throttle-fully open mode. Thus, a part of the fluid in the internal passage Ip flows at a small flow rate from the first outflow port 11b, of which the opening amount is narrowed, through the first outflow communication port 231a, and is supplied to the first fluid supply destination through the first outflow passage 15a. Another part of the fluid in the internal passage Ip flows out at a substantially same flow rate from the second outflow port 11c through the second outflow communication port 231b, and is supplied to the second fluid supply destination through the second outflow passage 16a.

Figure 21:
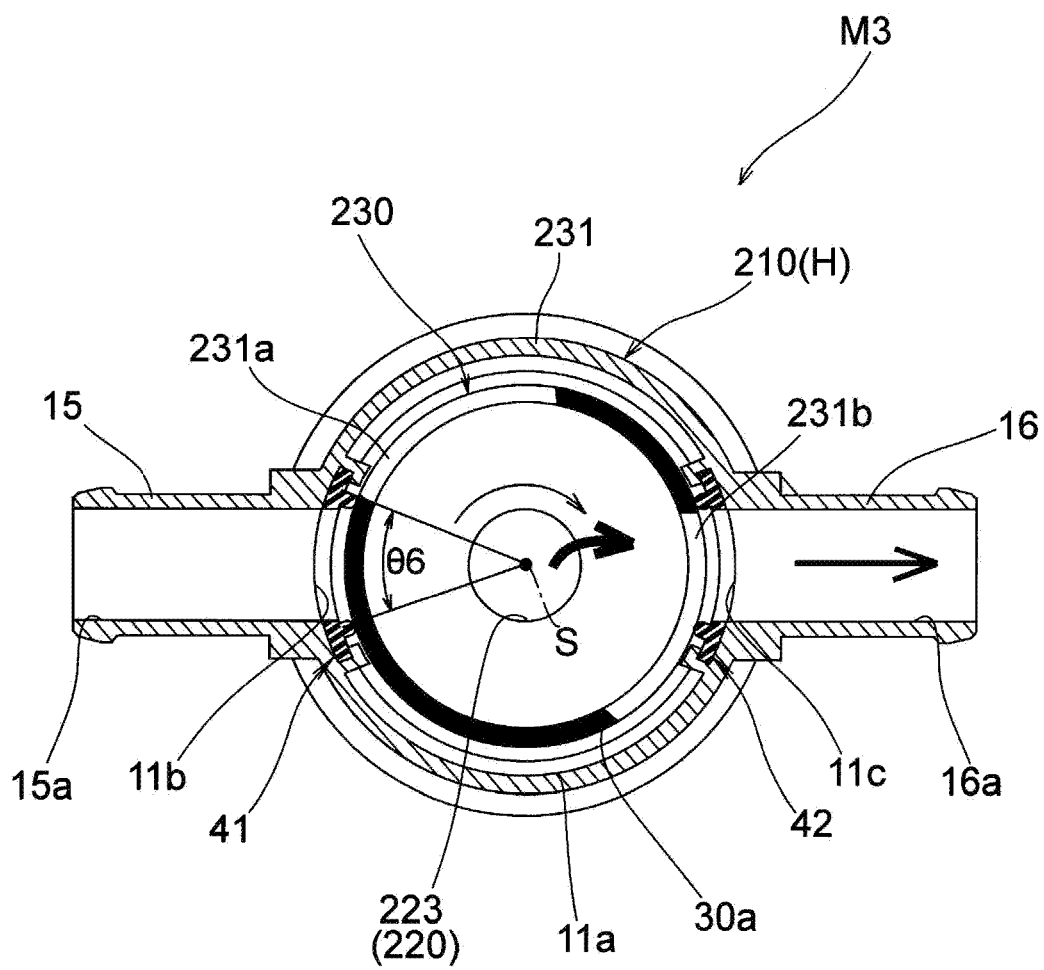
FIG. 21 is a cross-sectional view showing a fully close-fully open state in which the valve body rotates clockwise (arrow direction) by a predetermined angle from the throttle-fully open state shown in FIG. 20, and the first flow port (first outflow port) is closed and the second flow port (second outflow port) is maintained fully opened.

Subsequently, upon rotation of the valve body 230 clockwise from the state shown in FIG. 20 (an angle θ6, e.g., about 40 degrees, from the state shown in FIG. 19), as shown in FIG. 21, the first outflow port 11b is fully closed, and the second outflow port 11c is maintained fully opened. This state is a fully close-fully open mode. Thus, without flowing out from the first outflow port 11b, the fluid in the internal passage Ip flows out from the second outflow port 11c through the second outflow communication port 231b and is supplied to the second fluid supply destination through the second outflow passage 16a. That is, in the process from the state shown in FIG. 19 to the state shown in FIG. 21, the flow rate of the first outflow port 11b can be changed without changing the flow rate of the second outflow port 11c.

Figure 22:
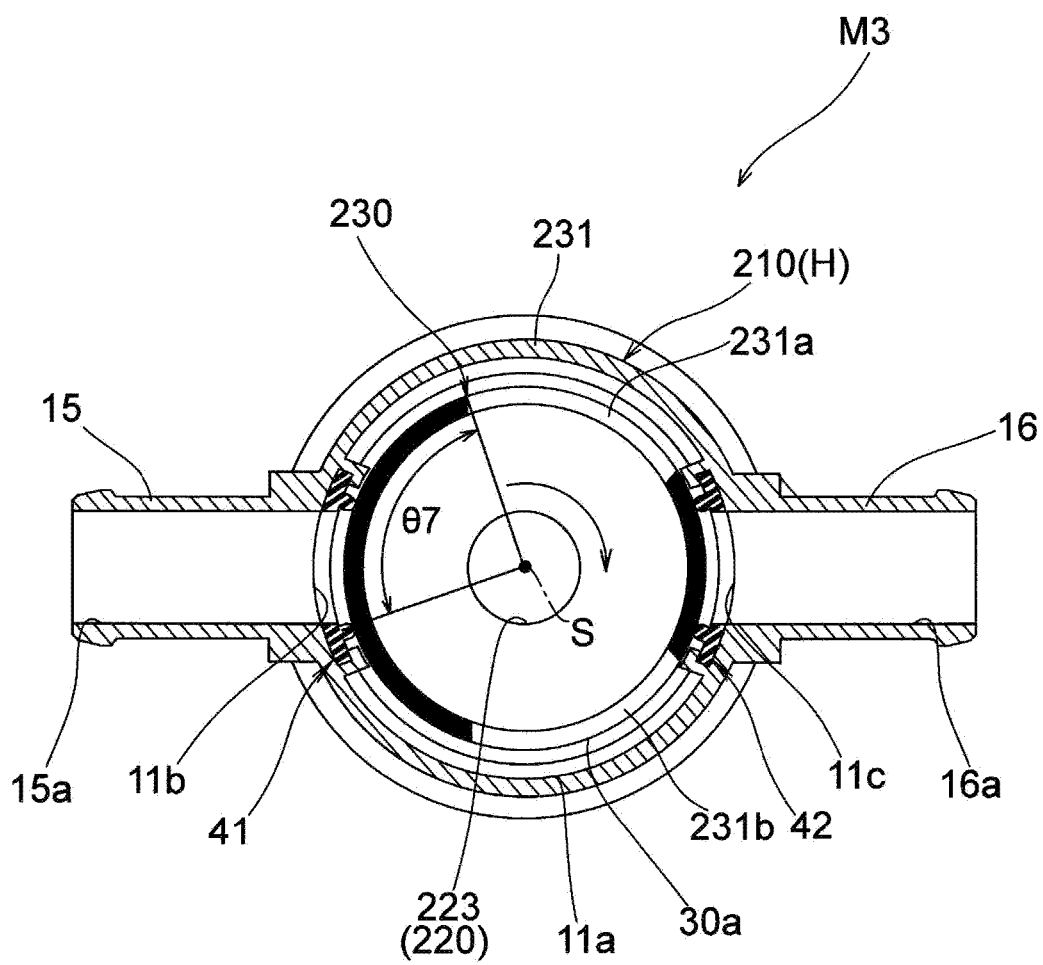
FIG. 22 is a cross-sectional view showing a fully close-fully close state in which the valve body rotates clockwise (arrow direction) by a predetermined angle from the fully close-fully open state shown in FIG. 21, and the first flow port (first outflow port) is closed and the second flow port (second outflow port) is closed.

Subsequently, upon rotation of the valve body 230 clockwise from the state shown in FIG. 21 (an angle θ7, e.g., about 90 degrees, from the state shown in FIG. 19), as shown in FIG. 22, the first outflow port 11b is fully closed, and the second outflow port 11c is fully closed. This state is a fully close-fully close mode. Thus, supply of the fluid from the first outflow port 11b to the first fluid supply destination and supply of the fluid from the second outflow port 11c to the second fluid supply destination are stopped at the same time.

Figure 23:
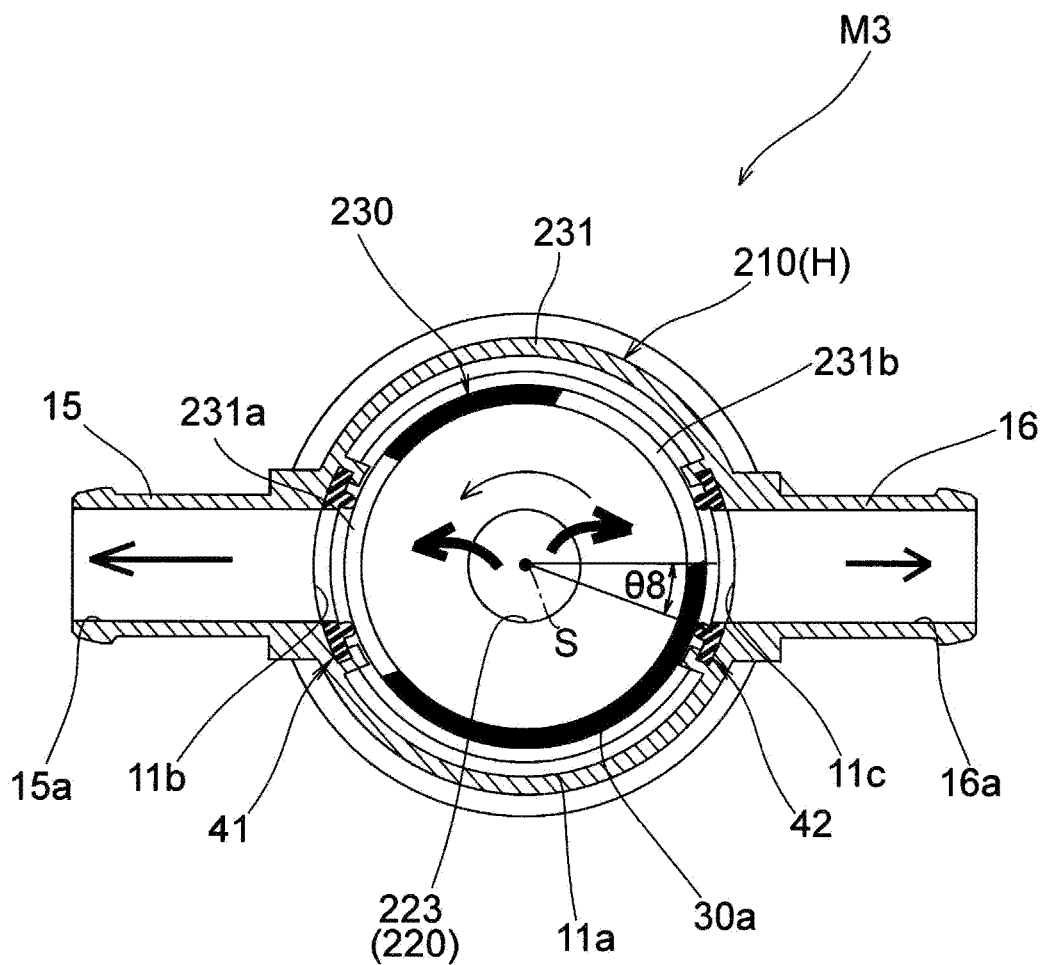
FIG. 23 is a cross-sectional view showing a fully open-throttle state in which the valve body rotates counterclockwise (arrow direction) by a predetermined angle from the fully open-fully open state shown in FIG. 19, and the first flow port (first outflow port) is maintained fully opened and the second flow port (second outflow port) is throttled.

On the other hand, upon rotation of the valve body 230 counterclockwise by an angle θ8 (e.g., about 16 degrees) from the state shown in FIG. 19, as shown in FIG. 23, the first outflow port 11b is maintained fully opened, and the second outflow port 11c is throttled. This state is a fully open-throttle mode. Thus, a part of the fluid in the internal passage Ip flows out at a substantially same flow rate from the first outflow port 11b through the first outflow communication port 231a and is supplied to the first fluid supply destination through the first outflow passage 15a. Another part of the fluid in the internal passage Ip flows out at a small flow rate from the second outflow port 11c, of which the opening amount is narrowed, through the second outflow communication port 231b, and is supplied to the second fluid supply destination through the second outflow passage 16a.

Figure 24:
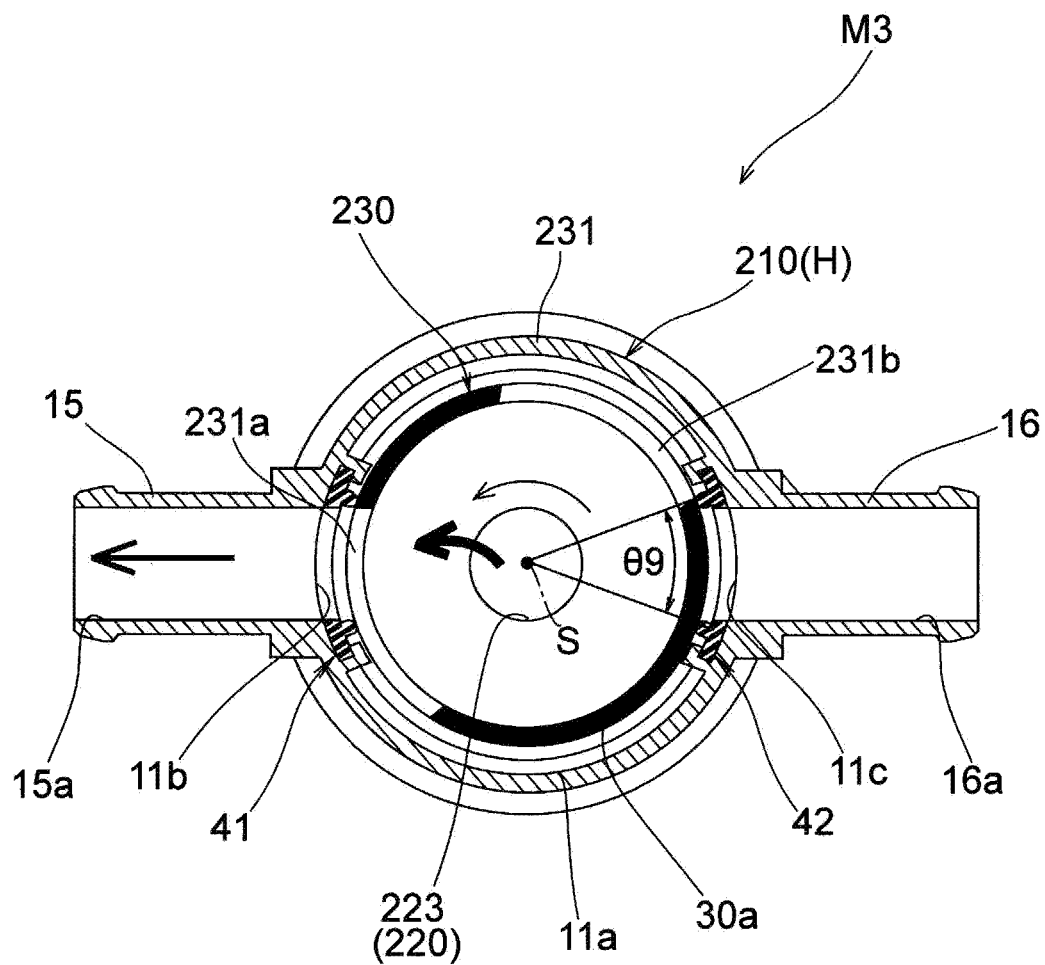
FIG. 24 is a cross-sectional view showing a fully open-fully close state in which the valve body rotates counter-clockwise (arrow direction) by a predetermined angle from the fully open-throttle state shown in FIG. 23, and the first flow port (first outflow port) is maintained fully opened and the second flow port (second outflow port) is closed.

Subsequently, upon rotation of the valve body 230 counterclockwise from the state shown in FIG. 23 (an angle θ9, e.g., about 40 degrees, counterclockwise from the state shown in FIG. 19), as shown in FIG. 24, the first outflow port 11b is maintained fully opened, and the second outflow port 11c is fully closed. This state is a fully open-fully close mode. Thus, without flowing out from the second outflow port 11c, the fluid in the internal passage Ip flows out from the first outflow port 11b through the first outflow communication port 231a and is supplied to the first fluid supply destination through the first outflow passage 15a. That is, in the process from the state shown in FIG. 19 to the states shown in FIG. 23 and FIG. 24, the flow rate of the second outflow port 11c can be changed without changing the flow rate of the first outflow port 11b.

Figure 25:
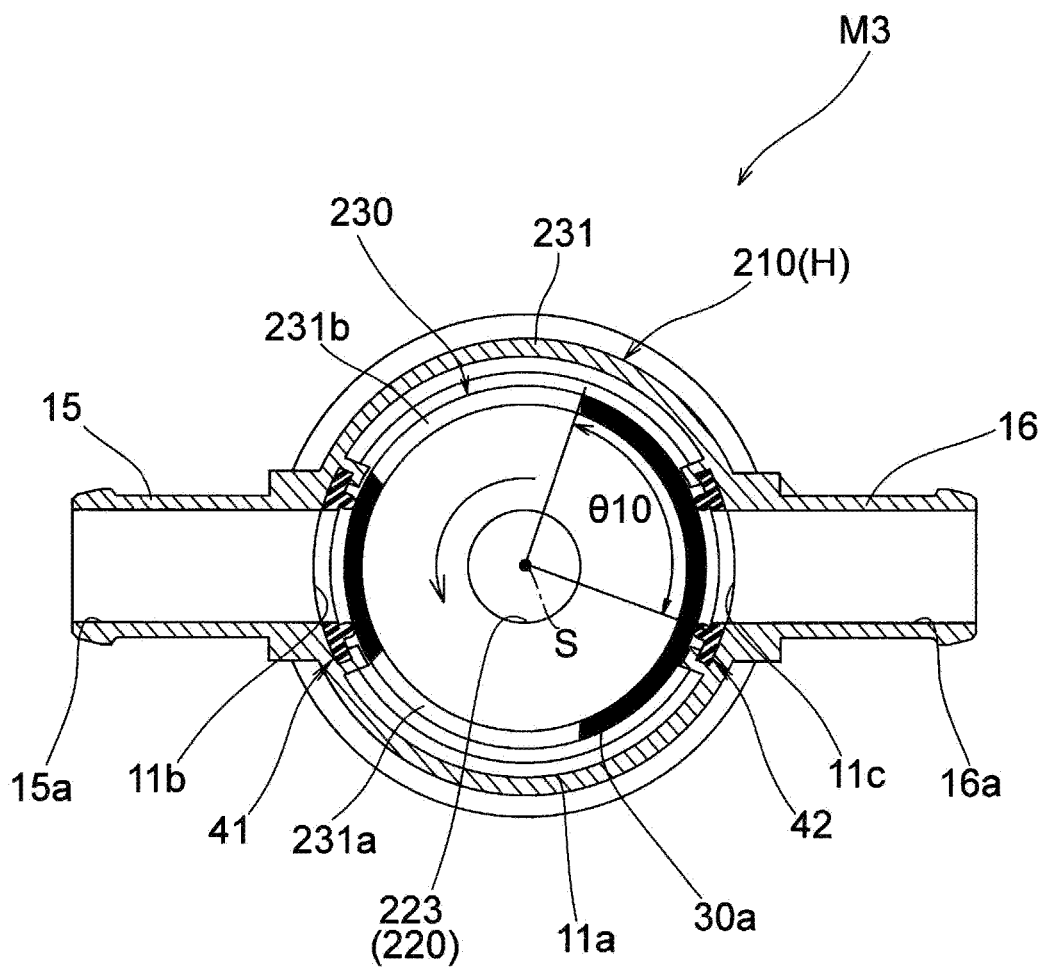
FIG. 25 is a cross-sectional view showing a fully close-fully close state in which the valve body rotates counter-clockwise (arrow direction) by a predetermined angle from the fully open-fully close state shown in FIG. 23, and the first flow port (first outflow port) is closed and the second flow port (second outflow port) is closed.
Figure 26:
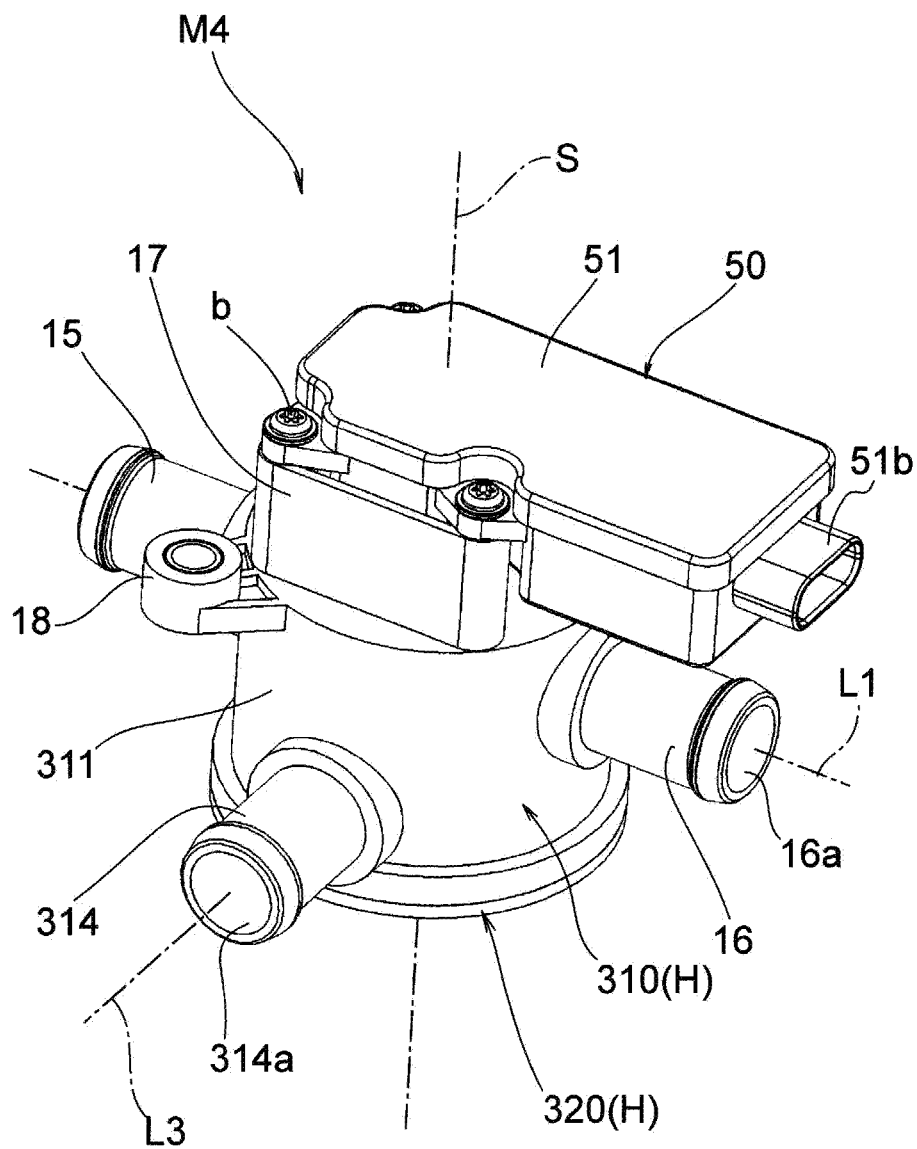
FIG. 26 is an external perspective view showing a valve device according to a fourth embodiment of the disclosure viewed from one side of the housing in the axial direction along the axis which is the center of rotation of the valve body.
Figure 27:
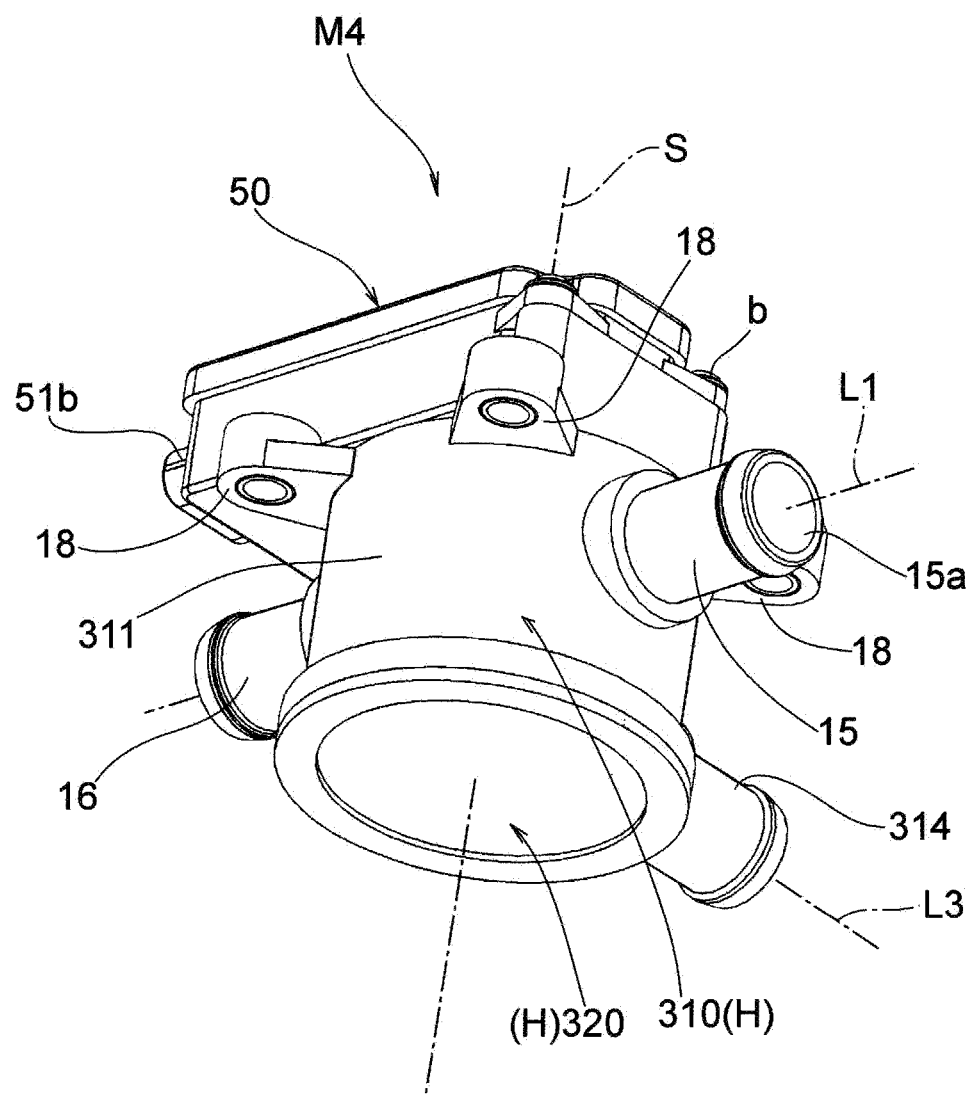
FIG. 27 is an external perspective view showing the valve device according to the fourth embodiment viewed from the other side of the housing in the axial direction.
Figure 28:
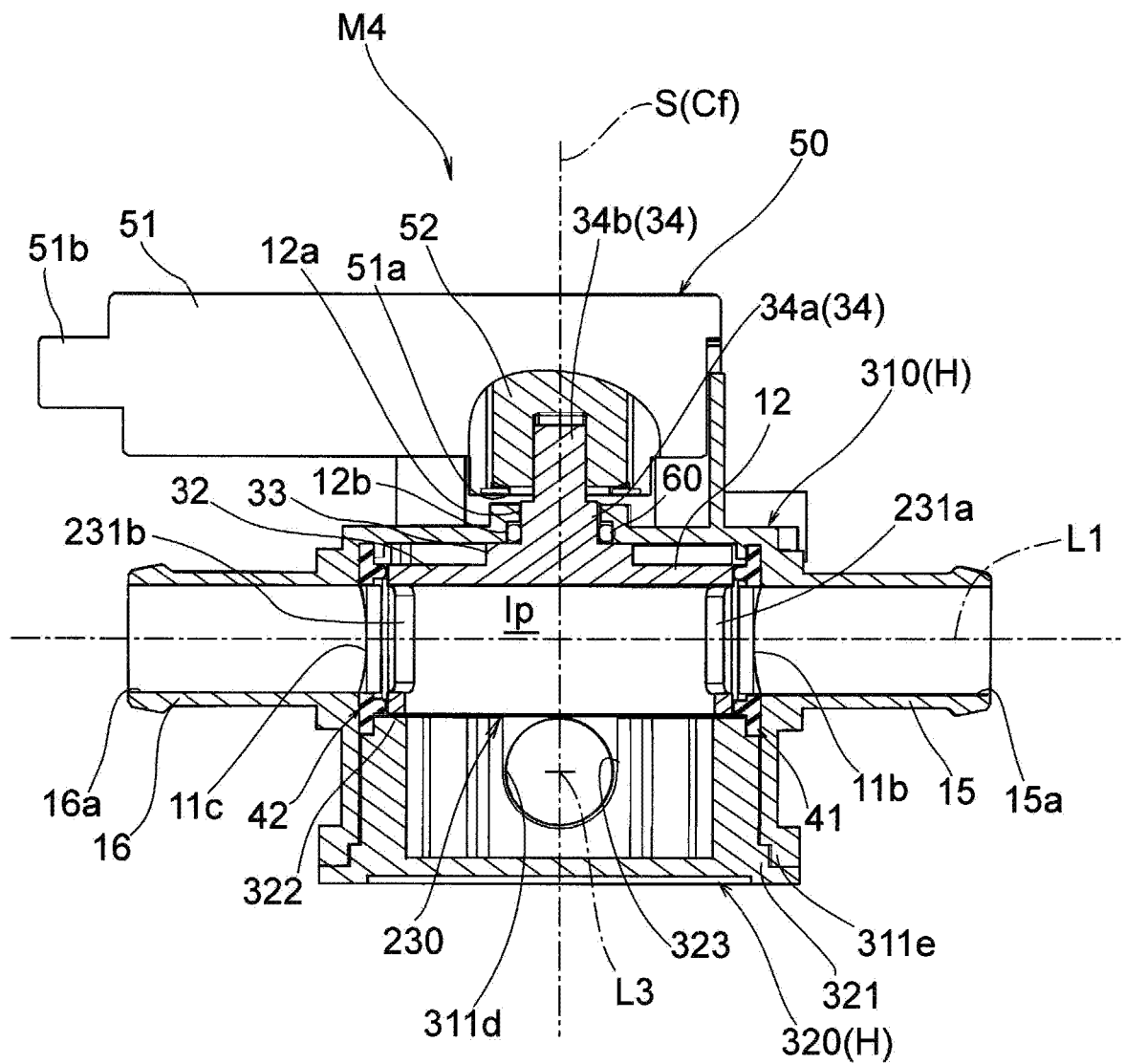
FIG. 28 is a cross-sectional view of the valve device according to the fourth embodiment taken along a plane including the axis which is the center of rotation of the valve body and a center line of the first flow port (first outflow port) and the second flow port (second outflow port).

Subsequently, upon rotation of the valve body 230 counterclockwise from the state shown in FIG. 24 (an angle θ10, e.g., about 90 degrees, from the state shown in FIG. 19), as shown in FIG. 25, the first outflow port 11b is fully closed, and the second outflow port 11c is also maintained fully closed. This state is a fully close-fully close mode. Thus, supply of the fluid from the first outflow port 11b to the first fluid supply destination and supply of the fluid from the second outflow port 11c to the second fluid supply destination are stopped at the same time.

According to the valve device M3 according to the third embodiment having the above configuration, the valve body 230 includes the internal passage Ip, the first outflow communication port 231a, and the second outflow communication port 231b. The internal passage Ip communicates with the inflow port 223. The first outflow communication port 231a expands in one direction in the circumferential direction Cd continuously with a region facing the first outflow port 11b to allow communication between the internal passage Ip and the first outflow port 11b, and has an opening width $Vw_1$ larger than the first opening width $Hw_1$. The second outflow communication port 231b expands in the other direction in the circumferential direction Cd continuously with a region facing the second outflow port 11c to allow communication between the internal passage Ip and the second outflow port 11c, and has an opening width $Vw_2$ larger than the second opening width $Hw_2$. Accordingly, in the configuration including two outflow ports 11b and 11c, the flow rate of one outflow port 11c (11b) can be throttled without changing the flow rate of the other outflow port 11b (11c). Further, the relationship between the opening width $Vw_1$ of the first outflow communication port 231a, the opening width $Vw_2$ of the second outflow communication port 231b, the first opening width $Hw_1$ of the first outflow port 11b, and the second opening width $Hw_2$ of the second outflow port 11c is formed to satisfy $Vw_1 \geq Hw_1 + Hw_2$ and $Vw_2 \geq Hw_2 + Hw_1$. Thus, it is possible to set the throttle-fully open mode and the fully open-throttle mode in addition to the fully open-fully open mode, the fully close-fully open mode, and the fully open-fully close mode.

Further, the inflow port 223 is arranged to be opened in a central region including the axis S. The housing body 210 includes the first outflow connection pipe 15 which defines the first outflow passage 15a leading to the first outflow port 11b, and the second outflow connection pipe 16 which defines the second outflow passage 16a leading to the second outflow port 11c. The housing cover 220 includes the inflow connection pipe 224 which defines the inflow passage 224a leading to the inflow port 223. Accordingly, at the housing body 210, only the first outflow port 11b and the second outflow port 11c are arranged, and a space for arranging the inflow port is not required. Thus, the diameter of the housing H can be reduced in a direction perpendicular to the axis S, and thus downsizing of the valve device M3 can be achieved.

FIG. 26 to FIG. 32 show a valve device M4 according to a fourth embodiment of the disclosure, which is similar to the valve device M3 according to the third embodiment except that a housing body 310 and a housing cover 320 are adopted instead of the housing body 210 and the housing cover 220. The same configurations according to the third embodiment will be labeled with the same reference signs, and descriptions thereof will be omitted. The valve device M4 according to the fourth embodiment includes a housing body 310 and a housing cover 320 as a housing H, a valve body 230, two seal members 41 and 42, a drive unit 50 as a drive source, an annular seal member 60, and three screws b.

The housing body 310 is formed of a material such as a resin material, metal, or alloy, and includes a cylindrical part 311 centered on the axis S, a top plate part 12, two mounting parts 13, an inflow connection pipe 314 as a main connection pipe, a first outflow connection pipe 15 as a first connection pipe, a second outflow connection pipe 16 as a second connection pipe, a fixing part 17, and three boss parts 18. The cylindrical part 311 is formed to be more elongated in the axis S direction than the cylindrical part 11 described above, and includes a first outflow port 11b as a first flow port and a second outflow port 11c as a second flow port that are opened apart in the circumferential direction Cd at the inner peripheral surface 11a, an inflow port 311d as a main flow port that is opened apart from the first outflow port 11b and the second outflow port 11c at the inner peripheral surface 11a, and a coupling part 311e.

Figure 29:
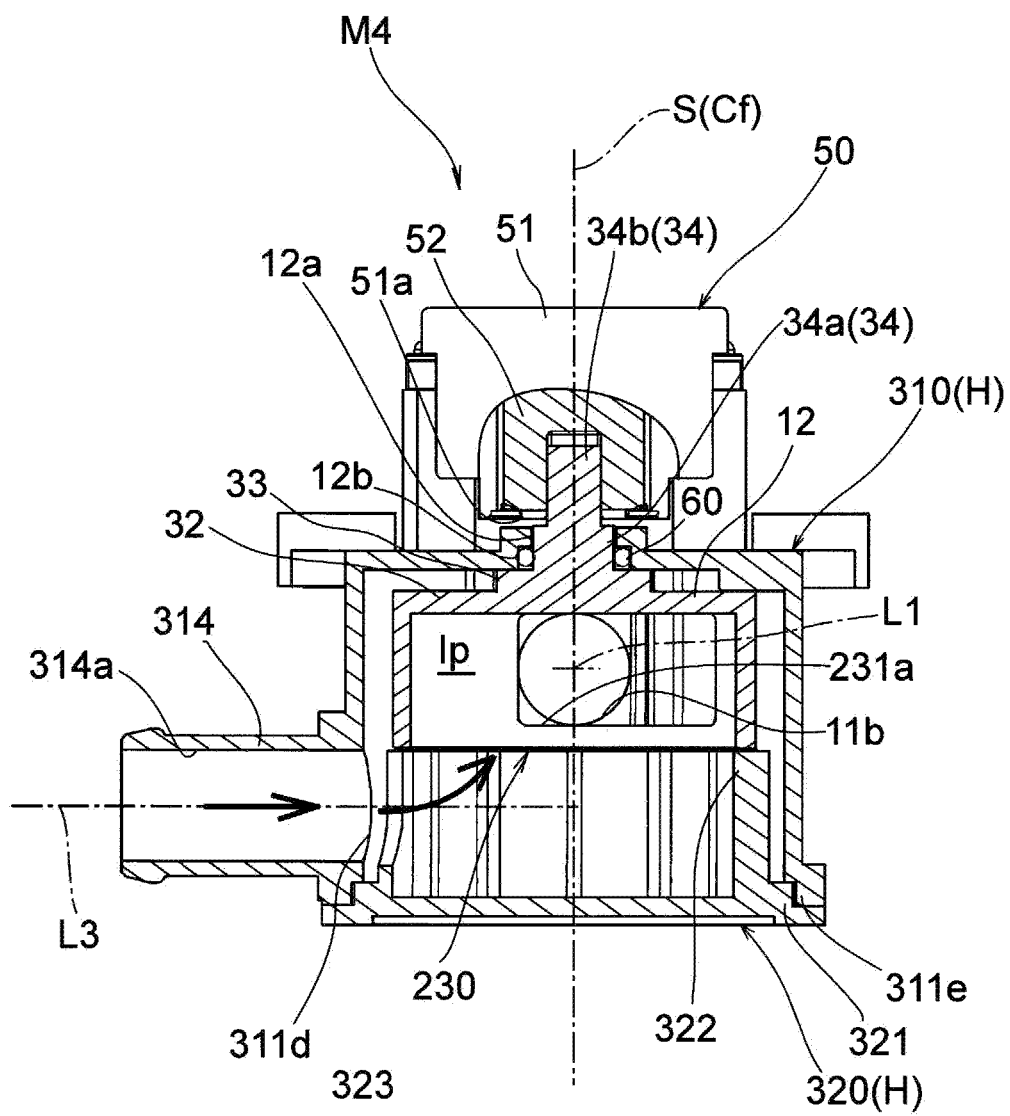
FIG. 29 is a cross-sectional view of the valve device according to the fourth embodiment taken along a plane including the axis which is the center of rotation of the valve body and a center line of the main flow port (inflow port).
Figure 30:
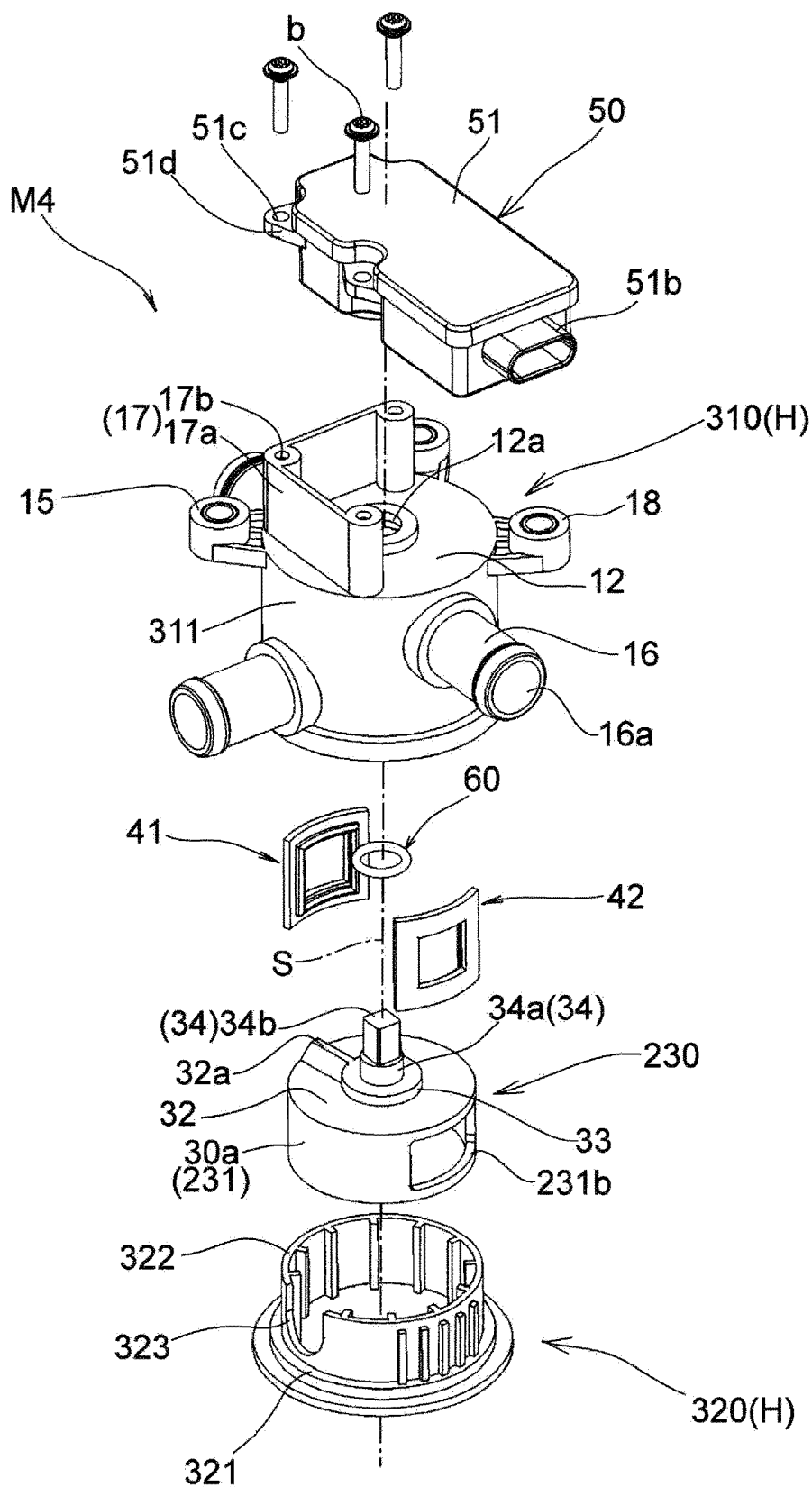
FIG. 30 is an exploded perspective view of the valve device according to the fourth embodiment viewed from one side in the axial direction.
Figure 31:
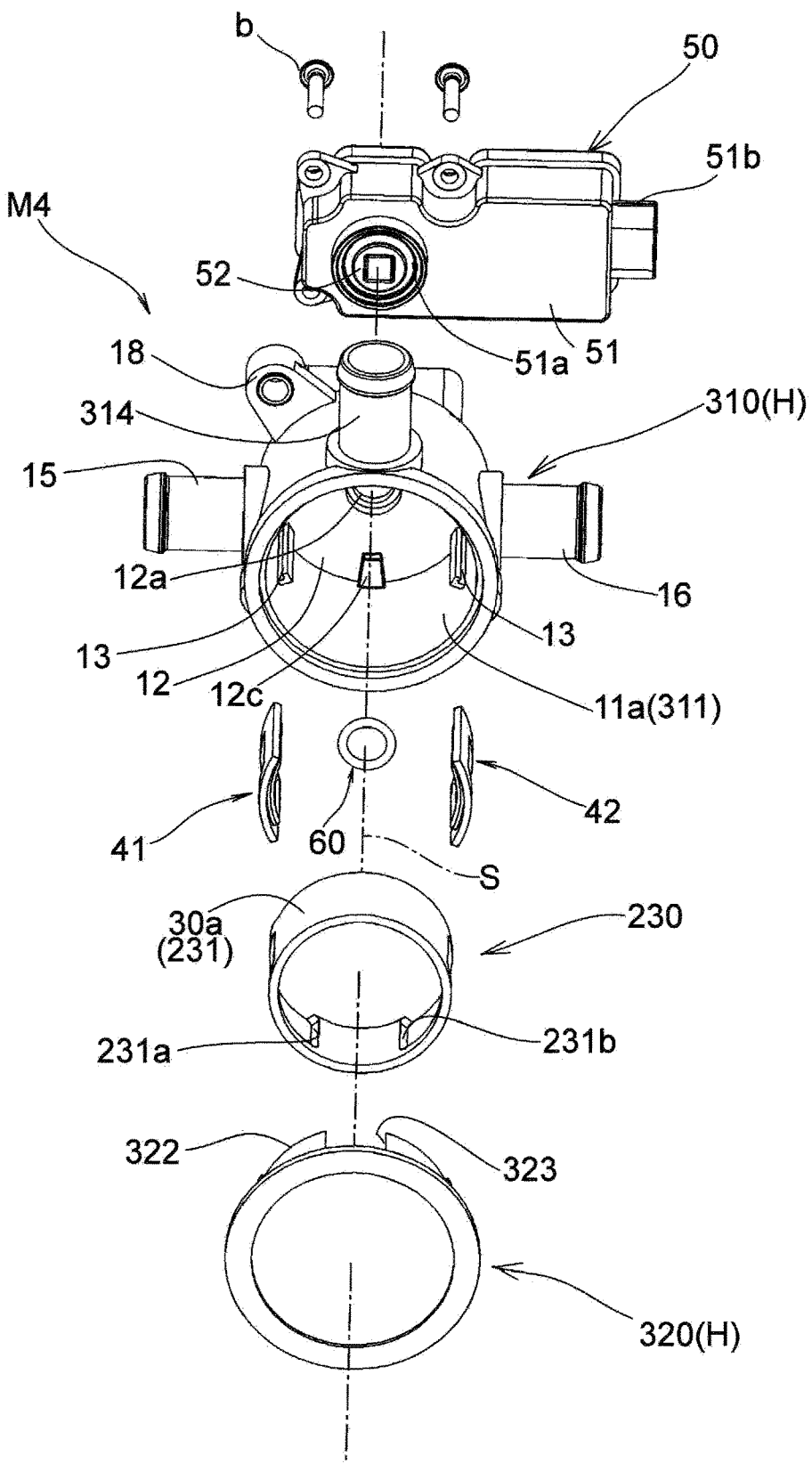
FIG. 31 is an exploded perspective view of the valve device according to the fourth embodiment viewed from the other side in the axial direction.

The inflow port 311d is a region through which a fluid flows in, forms an elliptical opening having an opening width $Hw_3$ in the circumferential direction Cd and centered on a straight line L3, and leads to an inflow passage 314a as a main passage defined by the inflow connection pipe 314. The straight line L3 is located on a central plane Cf perpendicular to the straight line L1 and including the axis S and deviates from the straight line L1 in the axis S direction. That is, as shown in FIG. 29, the inflow port 311d is arranged at a position separated from the valve body 230 in the axis S direction. Thus, the inflow port 311d may be arrange at any position in the circumferential direction Cd in an allowable range on the equipment regardless of the arrangement positions of the first outflow port 11b and the second outflow port 11c. The coupling part 311e is a region for coupling the housing cover 320 and is formed in a ring shape with a concave step centered on the axis S.

The inflow connection pipe 314 connects a fluid introduction pipe of the application target object, and defines the inflow passage 314a which extends about the straight line L3 in the radial direction perpendicular to the axis S and leads to the inflow port 311d. Since the inflow connection pipe 314 is arranged corresponding to the inflow port 311d, as described above, in an allowable range in relation to other parts, the inflow connection pipe 314 may be arranged at any position in the circumferential direction Cd, and the degree of freedom of arrangement on the equipment is increased.

The housing cover 320 is formed of the same material as the housing body 310 into a bottomed cylindrical shape, and includes a fitting part 321 fitted to the coupling part 311e of the housing body 310, a support part 322 that supports the valve body 230 in the axis S direction, and a notch part 323. The fitting part 321 is formed as a ring-shaped protrusion that is fitted into the coupling part 311e of the housing body 310, and is fixed by welding or the like as necessary after being fitted into the coupling part 311e. The support part 322 is formed as a cylindrical protrusion centered on the axis S, and supports the valve body 230 accommodated in the accommodation chamber C of the housing body 310 in the axis S direction. The notch part 323 is formed in a region facing the inflow port 311d such that the inflow port 311d communicates with the internal passage Ip of the valve body 230. Then, with the valve body 230 accommodated in the accommodation chamber C, the housing cover 320 is coupled to the housing body 310 to close the accommodation chamber C.

Figure 32:
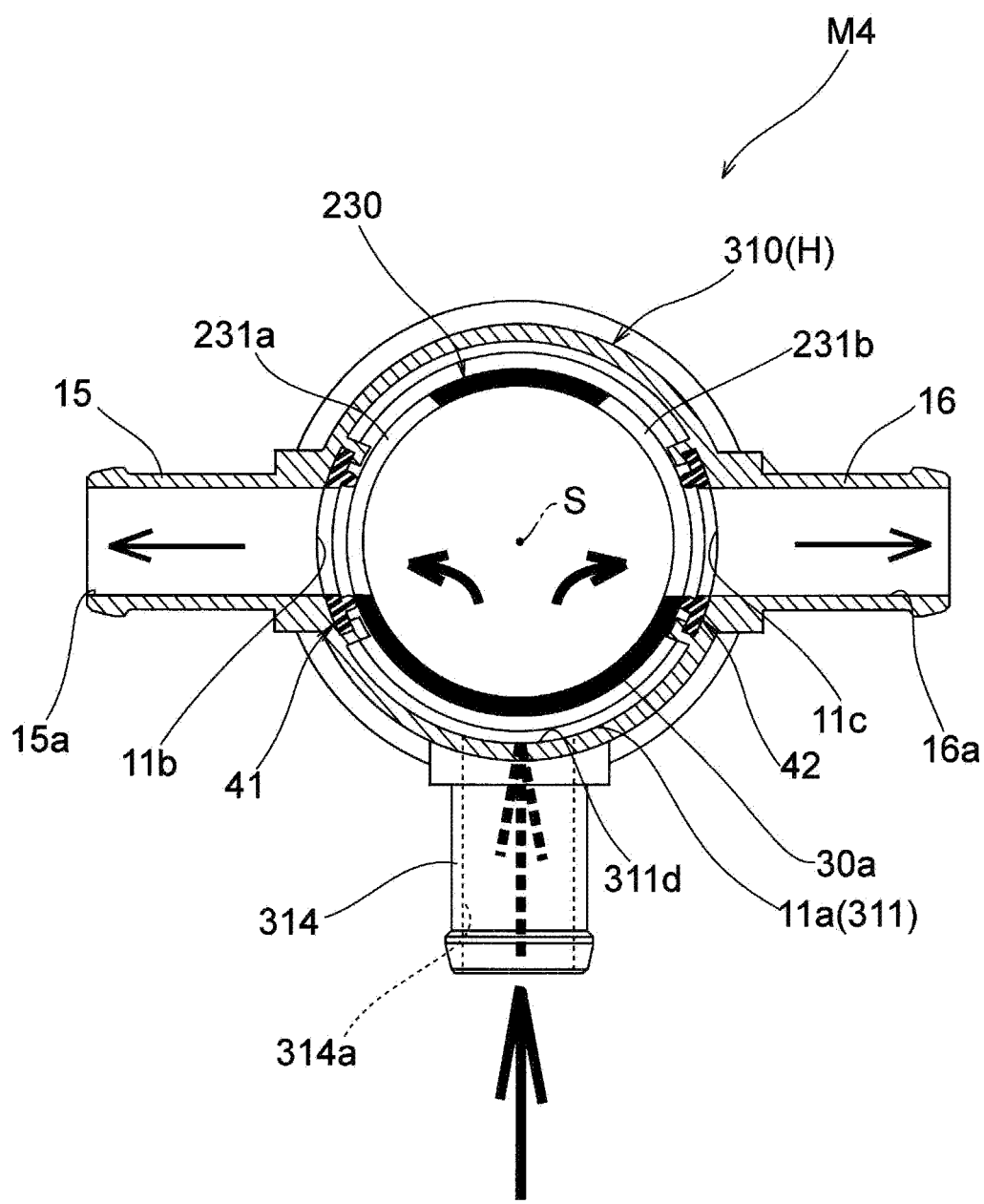
FIG. 32 is a cross-sectional view of the valve device according to the fourth embodiment taken along a plane that is perpendicular to the axis and passes through a center line of the first flow port (first outflow port) and the second flow port (second outflow port), showing a fully open-fully open state in which the first flow port (first outflow port) and the second flow port (second outflow port) are fully opened.

In the case where the state shown in FIG. 32 is assumed as an initial position, an operation of the valve device M4 according to the fourth embodiment is similar to the valve device M3 according to the third embodiment described above and may be performed in the operation modes including the fully open-fully open mode, the throttle-fully open mode, the fully close-fully open mode, the fully open-throttle mode, the fully open-fully close mode, and the fully close-fully close mode.

According to the valve device M4 according to the fourth embodiment having the above configuration, in the configuration including the two outflow ports 11b and 11c, the flow rate of one outflow port 11c (11b) can be throttled without changing the flow rate of the other outflow port 11b (11c). Further, the relationship between the opening width $Vw_1$ of the first outflow communication port 231a, the opening width $Vw_2$ of the second outflow communication port 231b, the first opening width $Hw_1$ of the first outflow port 11b, and the second opening width $Hw_2$ of the second outflow port 11c is formed to satisfy $Vw_1 \geq Hw_1 + Hw_2$ and $Vw_2 \geq Hw_2 + Hw_1$. Accordingly, it is possible to set the throttle-fully open mode and the fully open-throttle mode in addition to the fully close-fully open mode, the fully open-fully close mode, and the fully close-fully close mode.

Further, by arranging the first outflow port 11b and the second outflow port 11c at the same position in the axis S direction and arranging the inflow port 311d at a position separated from the valve body 230 in the axis S direction, the inflow port 311d may be arranged at any position in the circumferential direction Cd in an allowable range on the equipment regardless of the arrangement positions of the first outflow port 11b and the second outflow port 11c, and the inflow connection pipe 314 may also be arranged at any position in the circumferential direction Cd in an allowable range in relation to other parts, which increases the degree of freedom in the arrangement on the equipment. Further, similar to the third embodiment described above, the diameter of the housing H can be reduced in a direction perpendicular to the axis S, and thus downsizing of the valve device M4 can be achieved.

The above embodiments have shown that the first outflow port 11b and the second outflow port 11c are arranged plane-symmetrically with respect to the central plane Cf including the axis S, and the first outflow communication ports 31a and 231a and the second outflow communication ports 31b and 231b are arranged plane-symmetrically with respect to the central plane Cf including the axis S. However, the disclosure is not limited thereto, and other arrangement relationships or configurations may also be adopted as long as the flow rate of one outflow port can be throttled without changing the flow rate of the other outflow port.

The above embodiments have shown that the first outflow port 11b and the second outflow port 11c are arranged at positions separated by 180 degrees around the axis S, but the disclosure is not limited thereto, and the first outflow port 11b and the second outflow port 11c may also be arranged at other positions in a range in which the relationship with the first outflow communication ports 31a and 231a and the second outflow communication ports 31b and 231b is established.

The above embodiments have shown that the first outflow port 11b, the second outflow port 11c, the first outflow communication ports 31a and 231a, and the second outflow communication ports 31b and 231b are arranged at the same position in the axis S direction, but the disclosure is not limited thereto, and the positions of the first outflow port and the first outflow communication port may also be set at positions in the axis S direction that are different from the positions of the second outflow port and the second outflow communication port.

The above embodiments have shown that, as a housing, the housing H is composed of the housing body 10, 110, 210, and 310 and the housing cover 20, 220, and 320, but the disclosure is not limited thereto, and a housing in other forms may also be adopted as long as it is capable of accommodating the valve body 30 and 230.

The above embodiments have shown a configuration including the drive unit 50 as a drive source driving the valve body 30 and 230, but the disclosure is not limited thereto, and a configuration in which the rotating shaft of the valve body is protruded to outside the housing to perform rotation driving by manual operation or the like may also be adopted.

The above embodiments have shown the cylindrical valve bodies 30 and 230 defining the outer peripheral surface 30a centered on the axis S as the valve body, but the disclosure is not limited thereto, and a valve body having a spherical outer peripheral surface and a housing defining a spherical inner peripheral surface opposed to the outer peripheral surface of the valve body may also be adopted.

The above embodiments have shown that the seal members 41, 42, and 43 are arranged between the inner peripheral surface 11a of the housing H and the outer peripheral surface 30a of the valve bodies 30 and 230, but the disclosure is not limited thereto, and the seal members may also be omitted in the case of adopting a configuration in which the inner peripheral surface of the housing and the outer peripheral surface of the valve body slide in close contact, and leakage of the fluid from the contact interface is slight and irrelevant to the flow rate, or the flow rate adjustment is not required at high accuracy.

The above embodiments have shown the inflow ports 11d, 223, and 311d for flowing in the fluid as the main flow port through which the fluid passes, have shown the first outflow port 11b for flowing out the fluid as the first flow port through which the fluid passes, and have shown the second outflow port 11c for flowing out the fluid as the second flow port through which the fluid passes, but the disclosure is not limited thereto. Conversely, one outflow port for flowing out the fluid may be adopted as the main flow port through which the fluid passes, and two inflow ports including a first inflow port and a second inflow port for flowing in the fluid may be adopted as the first flow port and the second flow port through which the fluid passes.

As described above, the valve device of the disclosure achieves downsizing by reduction in thickness and reduction in diameter, and in a configuration including two flow ports arranged in the circumferential direction, the flow rate of one flow port can be throttled without changing the flow rate of the other flow port. Thus, in addition to being applicable to a cooling water supply system for a vehicle or the like, the valve device of the disclosure is also usable in fluid control systems in other fields or other fluid delivery machines.

What is claimed is:

1. A valve device comprising:
a housing defining: a main flow port through which a fluid passes; a first flow port and a second flow port which are opened apart in a circumferential direction at an inner peripheral surface centered on a predetermined axis to allow the fluid to pass therethrough and respectively have a first opening width and a second opening width in the circumferential direction; and an accommodation chamber; and
a valve body in a cylindrical shape which is arranged in the accommodation chamber and is capable of rotating around the axis to open and close the first flow port and the second flow port, wherein
the valve body comprises: an internal passage which communicates with the main flow port when the first flow port communicates with a first communication port and the second flow port communicates with a second communication port; the first communication port which expands in one direction in the circumferential direction continuously with a region facing the first flow port to allow communication between the internal passage and the first flow port, and has an opening width larger than the first opening width; and the second communication port which expands in the other direction in the circumferential direction continuously with a region facing the second flow port to allow communication between the internal passage and the second flow port, and has an opening width larger than the second opening width.

2. The valve device according to claim 1, wherein taking the opening width of the first communication port as $Vw_1$, the opening width of the second communication port as $Vw_2$, the first opening width as $Hw_1$, and the second opening width as $Hw_2$, the valve device is configured to satisfy:

$$Vw_1 \geq Hw_1 + Hw_2$$

$$Vw_2 \geq Hw_2 + Hw_1.$$

3. The valve device according to claim 2, wherein the first flow port and the second flow port are formed plane-symmetrically with respect to a central plane including the axis, and
the first communication port and the second communication port are formed plane-symmetrically with respect to the central plane.

4. The valve device according to claim 2, wherein the first flow port and the second flow port are arranged at positions separated by 180 degrees around the axis.

5. The valve device according to claim 2, wherein the main flow port is arranged to be opened to the inner peripheral surface.

6. The valve device according to claim 5, wherein the first flow port and the second flow port are arranged at a same position in a direction of the axis, the main flow port is arranged at a same position as the first flow port and the second flow port in the direction of the axis, and the valve body comprises a main communication port having an opening width larger than the opening widths of the first communication port and the second communication port to allow communication between the main flow port and the internal passage.

7. The valve device according to claim 6, wherein
the valve body is arranged with a gap with respect to the inner peripheral surface, and
the valve device comprises an annular seal member arranged between an outer peripheral surface of the valve body and the inner peripheral surface of the housing around the first flow port and the second flow port.

8. The valve device according to claim 7, comprising:
an annular seal member arranged between the outer peripheral surface of the valve body and the inner peripheral surface of the housing around the main flow port.

9. The valve device according to claim 5, wherein
the first flow port and the second flow port are arranged at a same position in a direction of the axis, and
the main flow port is arranged at a position separated from the valve body in the direction of the axis.

10. The valve device according to claim 9, wherein
the valve body is arranged with a gap with respect to the inner peripheral surface, and
the valve device comprises an annular seal member arranged between an outer peripheral surface of the valve body and the inner peripheral surface of the housing around the first flow port and the second flow port.

11. The valve device according to claim 5, wherein
the housing comprises: a housing body which defines the main flow port, the first flow port, the second flow port, and the accommodation chamber; and a housing cover coupled to the housing body to close the accommodation chamber.

12. The valve device according to claim 11, wherein
the first flow port and the second flow port are formed plane-symmetrically with respect to a central plane including the axis, and
the first communication port and the second communication port are formed plane-symmetrically with respect to the central plane.

13. The valve device according to claim 11, wherein
the first flow port and the second flow port are arranged at positions separated by 180 degrees around the axis.

14. The valve device according to claim 11, wherein
the housing body comprises: a main connection pipe which defines a main passage leading to the main flow port; a first connection pipe which defines a first passage leading to the first flow port; and a second connection pipe which defines a second passage leading to the second flow port.

15. The valve device according to claim 11, comprising:
a drive source which rotationally drives the valve body around the axis, wherein
the valve body comprises a rotating shaft coupled to a rotor of the drive source,
the housing body comprises a fixing part which fixes the drive source and an insertion hole through which the rotating shaft passes, and
the housing cover comprises a support part which rotatably supports the valve body.

16. The valve device according to claim 11, wherein
the main flow port is an inflow port for flowing in the fluid,
the first flow port is a first outflow port for flowing out the fluid, and
the second flow port is a second outflow port for flowing out the fluid.

17. The valve device according to claim 2, wherein
the main flow port is arranged to be opened in a central region including the axis.

18. The valve device according to claim 17, wherein
the first flow port and the second flow port are formed plane-symmetrically with respect to a central plane including the axis, and
the first communication port and the second communication port are formed plane-symmetrically with respect to the central plane.

19. The valve device according to claim 17, wherein
the first flow port and the second flow port are arranged at positions separated by 180 degrees around the axis.

20. The valve device according to claim 17, wherein
the valve body is arranged with a gap with respect to the inner peripheral surface, and
the valve device comprises an annular seal member arranged between an outer peripheral surface of the valve body and the inner peripheral surface of the housing around the first flow port and the second flow port.

21. The valve device according to claim 17, wherein
the housing comprises: a housing body which defines the first flow port, the second flow port, and the accommodation chamber; and a housing cover which defines the main flow port and is coupled to the housing body to close the accommodation chamber.

22. The valve device according to claim 21, wherein
the housing body comprises: a first connection pipe which defines a first passage leading to the first flow port; and a second connection pipe which defines a second passage leading to the second flow port, and
the housing cover comprises a main connection pipe which defines a main passage leading to the main flow port.

23. The valve device according to claim 21, comprising:
a drive source which rotationally drives the valve body around the axis, wherein
the valve body comprises a rotating shaft coupled to a rotor of the drive source,
the housing body comprises a fixing part which fixes the drive source and an insertion hole through which the rotating shaft passes, and
the housing cover comprises a support part which rotatably supports the valve body.

24. The valve device according to claim 21, wherein
the main flow port is an inflow port for flowing in the fluid,
the first flow port is a first outflow port for flowing out the fluid, and
the second flow port is a second outflow port for flowing out the fluid.

* * * * *